United States Patent
Paladugu et al.

(10) Patent No.: US 11,044,632 B2
(45) Date of Patent: Jun. 22, 2021

(54) HEADER COMPRESSION HANDLING DURING HANDOVER

(71) Applicant: QUALCOMM Incorporated, San Diego, CA (US)

(72) Inventors: Karthika Paladugu, San Diego, CA (US); Sitaramanjaneyulu Kanamarlapudi, San Diego, CA (US); Ozcan Ozturk, San Diego, CA (US); Prasad Reddy Kadiri, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/808,091

(22) Filed: Mar. 3, 2020

(65) Prior Publication Data

US 2020/0367101 A1    Nov. 19, 2020

Related U.S. Application Data

(60) Provisional application No. 62/847,262, filed on May 13, 2019.

(51) Int. Cl.
*H04W 28/06* (2009.01)
*H04W 76/15* (2018.01)
*H04W 36/00* (2009.01)

(52) U.S. Cl.
CPC ........ *H04W 28/06* (2013.01); *H04W 36/0011* (2013.01); *H04W 76/15* (2018.02)

(58) Field of Classification Search
None
See application file for complete search history.

(56) References Cited

U.S. PATENT DOCUMENTS

| 7,995,533 B1* | 8/2011 | Koodli | H04W 36/0011 370/331 |
| 2013/0315209 A1* | 11/2013 | Murakami | H04L 69/22 370/331 |

(Continued)

OTHER PUBLICATIONS

Catt: "Further Consideration on Simultaneous Connectivity Handover", 3GPP Draft, 3GPP TSG-RAN WG2 Meeting #105, R2-1900274, 3rd Generation Partnership Project (3GPP), Mobile Competence Centre, 650, Route Des Lucioles, F-06921, Sophia-Antipolis Cedex, France, vol. RAN WG2, No. Athens, Greece; Feb. 25, 2019-Mar. 1, 2019, Feb. 15, 2019 (Feb. 15, 2019), XP051601672, 3 pages, Retrieved from the Internet:URL:http://www.3gpp.org/ftp/tsg%5Fran/WG2%5FRL2/TSGR2%5F105/Docs/R2%2D1900274%2Ezip [retrieved on Feb. 15, 2019], pp. 1-3.

(Continued)

*Primary Examiner* — Otis L Thompson, Jr.
(74) *Attorney, Agent, or Firm* — Patterson & Sheridan, L.L.P.

(57) ABSTRACT

Aspects of the present disclosure relate to wireless communications, and more particularly, handling header compression in scenarios with concurrent connections, such as make-before-break (MBB) handover or dual connectivity (DC) scenarios. A method of wireless communication performed by a user equipment (UE) can include concurrently communicating with a first base station (BS) on a connection with the first BS and with a second BS on a connection with the second BS during a handover procedure. The UE maintains a context for a header compression protocol for the connection with the first BS and the connection with the second BS. The concurrently communicating includes using the header compression protocol context for sending one or more packets, receiving one or more packets, or both.

30 Claims, 23 Drawing Sheets

(56) References Cited

U.S. PATENT DOCUMENTS

| | | | |
|---|---|---|---|
| 2014/0133454 A1* | 5/2014 | Chan | H04L 65/607 370/331 |
| 2016/0234353 A1* | 8/2016 | Kwon | H04H 20/33 |
| 2018/0020386 A1* | 1/2018 | Chandramouli | H04W 36/0027 |
| 2018/0020418 A1* | 1/2018 | Chandramouli | H04W 16/14 |
| 2018/0220344 A1* | 8/2018 | Shaheen | H04W 4/60 |
| 2018/0324642 A1 | 11/2018 | Yu et al. | |
| 2019/0141770 A1* | 5/2019 | Takahashi | H04W 76/16 |
| 2019/0215721 A1* | 7/2019 | Tang | H04W 36/0069 |
| 2020/0015130 A1* | 1/2020 | Wang | H04W 36/30 |
| 2020/0163130 A1* | 5/2020 | Hori | H04W 76/27 |

OTHER PUBLICATIONS

Ericsson: "User: Plane Aspects of-Make-Before-Break," 3GPP Draft, 3GPP TSG-RAN WG2#106, R2-1907318, 3rd Generation Partnership Project (3GPP), Mobile Competence Centre, 650, Route Des Lucioles, F-06921, Sophia-Antipolis Cedex, France, vol. RAN WG2, No. Reno, Nevada, USA; May 13, 2019-May 17, 2019, May 2, 2019 (May 2, 2019), XP051711603, pp. 1-5, Retrieved from the Internet: URL:http://www.3gpp.org/ftp/tsg%5Fran/WG2%5FRL2/TSGR2%5F106/Docs/R2%2D1907318%2Ezip [retrieved on May 2, 2019],pp. 1-4.

Huawei, et al., "DC Operation for Robust Handover", 3GPP Draft 3GPP TSG-RAN2 #98, R2-1704855, DC Operation for Robust Handover, 3rd Generation Partnership Project (3GPP), Mobile Competence Centre, 650, Route Des Lucioles, F-06921, Sophia-Antipolis Cedex, France, vol. RAN WG2, No. Hangzhou, China; May 15, 2017-May 19, 2017, May 14, 2017 (May 14, 2017), XP051275371, 5 pages, Retrieved from the Internet:URL:http://www.3gpp.org/ftp/Meetings_3GPP_SYNC/RAN2/Docs/, [retrieved on May 14, 2017], pp. 4-5.

International Search Report and Written Opinion—PCT/US2020/020935—ISA/EPO—dated May 19, 2020.

OPPO: "User Plane Consideration for eMBB Based Handover", 3GPP Draft, 3GPP TSG-RAN WG2 Meeting #105, R2-1900185—User Plane Consideration for eMBB Based Handover for NR Mobility, 3rd Generation Partnership Project (3GPP), Mobile Competence Centre, 650, Route Des Lucioles, F-06921, Sophia-Antipolis Cedex, France, vol. RAN WG2, No. Athens, Greece; Feb. 25, 2019-Mar. 1, 2019, Feb. 15, 2019 (Feb. 15, 2019), XP051601585, 4 pages, Retrieved from the Internet: URL: http://www.3gpp.org/ftp/tsg%5Fran/WG2%5FRL2/TSGR2%5F105/Docs/R2%2D1900185%2Ezip [retrieved on Feb. 15, 2019], the whole document.

Qualcomm Incorporated: "ROHC Handling During Make-Before-Break (MBB) HO", 3GPP Draft, 3GPP TSG-RAN WG2 Meeting #106, R2-1905791, 3rd Generation Partnership Project (3GPP), Mobile Competence Centre, 650, Route Des Lucioles, F-06921, Sophia-Antipolis Cedex, France, vol. RAN WG2, No. Reno, Nevada; May 13, 2019-May 17, 2019, May 3, 2019 (May 3, 2019), XP051710144, 4 pages, Retrieved from the Internet:URL:http://www.3gpp.org/ftp/tsg%5Fran/WG2%5FRL2/TSGR2%5F106/Docs/R2%2D1905791%2Ezip [retrieved on May 3, 2019], pp. 1-4.

* cited by examiner

HEADER COMPRESSION HANDLING DURING HANDOVER

CROSS-REFERENCE TO RELATED APPLICATION(S)

This application claims benefit of and priority to U.S. Provisional Application No. 62/847,262, filed May 13, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, handling header compression in scenarios with concurrent connections during handover.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is referred to as new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide a method for wireless communications by a user equipment (UE). The method generally includes concurrently communicating with a first base station (BS) on a connection with the first BS and with a second BS on a connection with the second BS. The method generally includes maintaining a context for a header compression protocol for the connection with the first BS and the connection with the second BS. The concurrently communicating includes using the header compression protocol context for sending one or more packets, receiving one or more packets, or both.

Certain aspects of the present disclosure provide a method for wireless communication that may be performed by a first BS. The method generally includes concurrently communicating with a UE, connected to the first BS, while the UE is connected to and communicating with a second BS. The method generally includes maintaining a context for a header compression protocol for the connection with the UE with at least the first BS. The concurrently communicating includes using the header compression protocol context for sending one or more packets, receiving one or more packets, or both.

Certain aspects of the present disclosure provide an apparatus for wireless communications. The apparatus generally includes at least processor coupled with a memory. The memory includes code executable by the at least one processor to cause the apparatus to concurrently communicate with a first BS on a connection with the first BS and with a second BS on a connection with the second BS. The memory includes code executable by the at least one processor to cause the apparatus to maintain a context for a header compression protocol for the connection with the first BS and the connection with the second BS. The concurrently communicating includes using the header compression protocol context for sending one or more packets, receiving one or more packets, or both.

Certain aspects of the present disclosure provide an apparatus for wireless communication. The apparatus generally includes at least processor coupled with a memory. The memory includes code executable by the at least one processor to cause the apparatus to concurrently communicate with a UE, connected to the apparatus, while the UE is connected to and communicating with another apparatus. The memory includes code executable by the at least one processor to cause the apparatus to maintain a context for a header compression protocol for the connection with the UE with at least the apparatus. The concurrently communicating includes using the header compression protocol context for sending one or more packets, receiving one or more packets, or both.

Certain aspects of the present disclosure provide an apparatus for wireless communications. The apparatus generally includes means for concurrently communicating with a first BS on a connection with the first BS and with a second BS on a connection with the second BS. The apparatus generally includes means for maintaining a context for a header compression protocol for the connection with the first BS and the connection with the second BS. The concurrently communicating includes using the header compression protocol context for sending one or more packets, receiving one or more packets, or both.

Certain aspects of the present disclosure provide an apparatus for wireless communication. The apparatus generally includes means for concurrently communicating with a UE, connected to the apparatus, while the UE is connected to and communicating with another apparatus. The apparatus generally includes means for maintaining a context for a header compression protocol for the connection with the UE with at least the apparatus. The concurrently communicating includes using the header compression protocol context for sending one or more packets, receiving one or more packets, or both.

Certain aspects of the present disclosure provide a computer readable medium storing computer executable code thereon for wireless communications. The computer executable code generally includes code for concurrently communicating with a first BS on a connection with the first BS and with a second BS on a connection with the second BS. The computer executable code generally includes code for maintaining a context for a header compression protocol for the connection with the first BS and the connection with the second BS. The concurrently communicating includes using the header compression protocol context for sending one or more packets, receiving one or more packets, or both.

Certain aspects of the present disclosure provide a computer readable medium storing computer executable code thereon for wireless communications. The computer executable code generally includes code for concurrently communicating with a UE, connected to a first BS, while the UE is connected to and communicating with a second BS. The computer executable code generally includes code for maintaining a context for a header compression protocol for the connection with the UE with at least the first BS. The concurrently communicating includes using the header compression protocol context for sending one or more packets, receiving one or more packets, or both.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
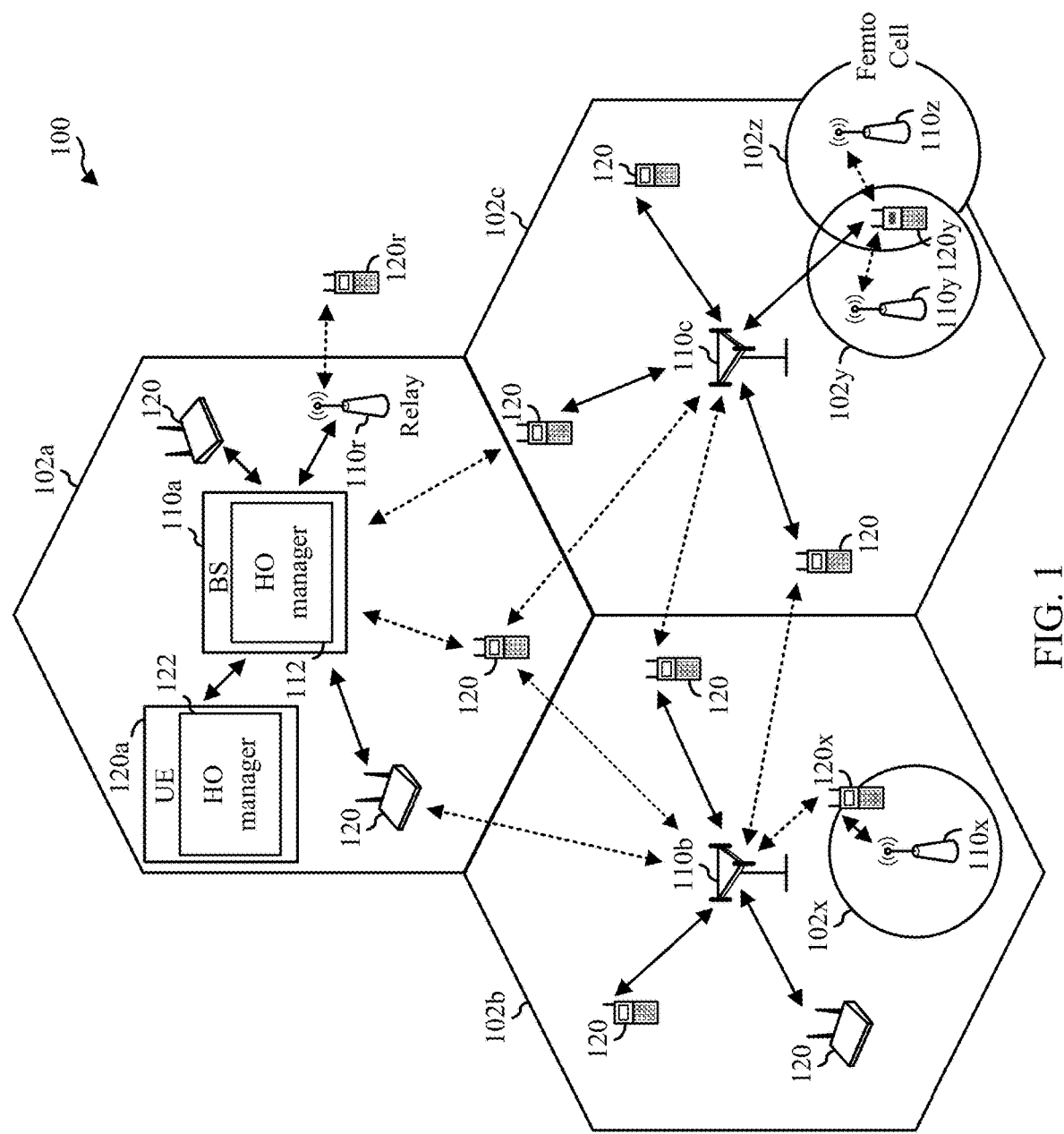
FIG. 1 is a block diagram conceptually illustrating an example wireless communication network, in accordance with certain aspects of the present disclosure.

Aspects of the present disclosure provide apparatus, methods, processing systems, and computer readable mediums for handling header compression in scenarios where a user equipment (UE) has concurrent connections with multiple network entities, such as during a handover in make-before-break (MBB) handover, dual active protocol stack (DAPS) handover, and/or dual connectivity (DC) scenarios.

The following description provides examples of header compression handling during handover, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

The techniques described herein may be used for various wireless networks and radio technologies. While aspects may be described herein using terminology commonly associated with 3G, 4G, and/or 5G wireless technologies, aspects of the present disclosure can be applied in other generation-based, such as later NR technologies.

NR may support various wireless communication services, such as Enhanced mobile broadband (eMBB) targeting wide bandwidth (e.g. 80 MHz beyond), millimeter wave (mmW) targeting high carrier frequency (e.g. 24 GHz to 53 GHz or beond), massive MTC (mMTC) targeting non-backward compatible MTC techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. The wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes called a "a cell", which may be stationary or may move according to the location of a mobile BS 110. In some examples, the BSs 110 may be interconnected to one another and/or to one or more other BSs or network nodes (not shown) in the wireless communication network 100 through various types of backhaul interfaces (e.g., a direct physical connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple cells. A network controller 130 may couple to a set of BSs and provide coordination and control for these BSs. The network controller 130 may communicate with the BSs 110 via a backhaul.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. The wireless communication network 100 may also include relay stations (e.g., relay station 110r) that that receive a transmission of data and/or other information from an upstream station (e.g., a BS 110a or a UE 120r) and sends a transmission of the data and/or other information to a downstream station (e.g., a UE 120 or a BS 110).

According to certain aspects, the BSs 110 and UEs 120 may be configured for header compression during handover. As shown in FIG. 1, the BS 110a includes a HO manager 112 and the UE 120a includes a HO manager 122. The HO manager 112 and the HO manager 122 may be configured for header compression during handover, in accordance with aspects of the present disclosure.

Figure 2:
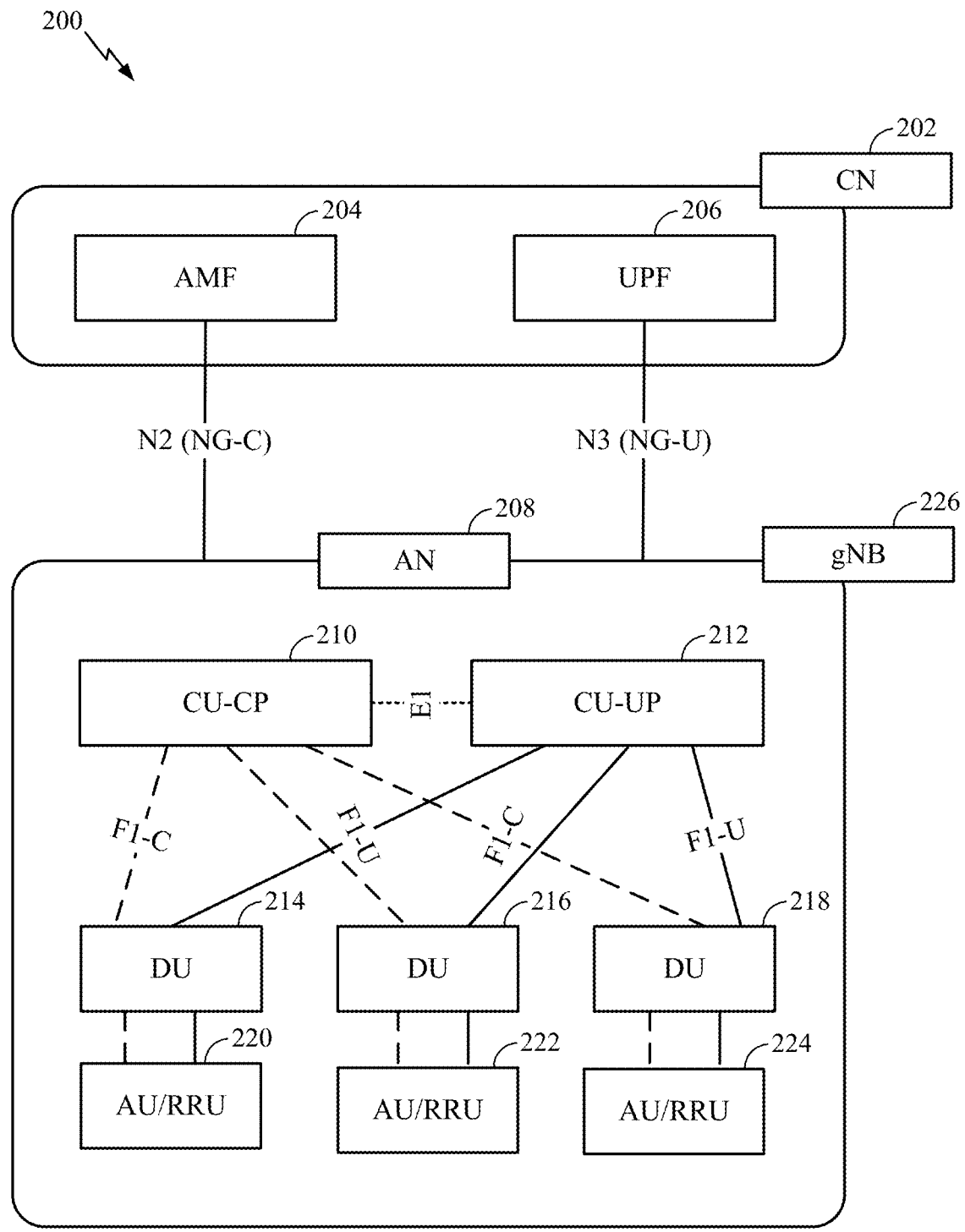
FIG. 2 is a block diagram illustrating an example architecture of a distributed radio access network (RAN), in accordance with certain aspects of the present disclosure.

FIG. 2 illustrates an example architecture of a distributed Radio Access Network (RAN) 200, which may be implemented in the wireless communication network 100 illustrated in FIG. 1. As shown in FIG. 2, the distributed RAN includes Core Network (CN) 202 and Access Node 208.

The CN 202 may host core network functions. CN 202 may be centrally deployed. CN 202 functionality may be offloaded (e.g., to advanced wireless services (AWS)), in an effort to handle peak capacity. The CN 202 may include the Access and Mobility Management Function (AMF) 204 and User Plane Function (UPF) 206. The AMF 204 and UPF 206 may perform one or more of the core network functions.

The AN 208 may communicate with the CN 202 (e.g., via a backhaul interface). The AN 208 may communicate with the AMF 204 via an N2 (e.g., NG-C) interface. The AN 208 may communicate with the UPF 206 via an N3 (e.g., NG-U) interface. The AN 208 may include a central unit-control plane (CU-CP) 210, one or more central unit-user plane (CU-UPs) 212, one or more distributed units (DUs) 214-218, and one or more Antenna/Remote Radio Units (AU/RRUs) 220-224. The CUs and DUs may also be referred to as gNB-CU and gNB-DU, respectively. One or more components of the AN 208 may be implemented in a gNB 226. The AN 208 may communicate with one or more neighboring gNBs.

The CU-CP 210 may be connected to one or more of the DUs 214-218. The CU-CP 210 and DUs 214-218 may be connected via a F1-C interface. As shown in FIG. 2, the CU-CP 210 may be connected to multiple DUs, but the DUs may be connected to only one CU-CP. Although FIG. 2 only illustrates one CU-UP 212, the AN 208 may include multiple CU-UPs. The CU-CP 210 selects the appropriate CU-UP(s) for requested services (e.g., for a UE). The CU-UP(s) 212 may be connected to the CU-CP 210. For example, the CU-UP(s) 212 and the CU-CP 210 may be connected via an E1 interface. The CU-CP(s) 210 may be connected to one or more of the DUs 214-218. The CU-UP(s) 212 and DUs 214-218 may be connected via a F1-U interface. As shown in FIG. 2, the CU-CP 210 may be connected to multiple CU-UPs, but the CU-UPs may be connected to only one CU-CP.

A DU, such as DUs 214, 216, and/or 218, may host one or more TRP(s) (transmit/receive points, which may include an Edge Node (EN), an Edge Unit (EU), a Radio Head (RH), a Smart Radio Head (SRH), or the like). A DU may be located at edges of the network with radio frequency (RF) functionality. A DU may be connected to multiple CU-UPs that are connected to (e.g., under the control of) the same CU-CP (e.g., for RAN sharing, radio as a service (RaaS), and service specific deployments). DUs may be configured to individually (e.g., dynamic selection) or jointly (e.g., joint transmission) serve traffic to a UE. Each DU 214-216 may be connected with one of AU/RRUs 220-224.

The CU-CP 210 may be connected to multiple DU(s) that are connected to (e.g., under control of) the same CU-UP 212. Connectivity between a CU-UP 212 and a DU may be established by the CU-CP 210. For example, the connectivity between the CU-UP 212 and a DU may be established using Bearer Context Management functions. Data forwarding between CU-UP(s) 212 may be via a Xn-U interface.

The distributed RAN 200 may support fronthauling solutions across different deployment types. For example, the RAN 200 architecture may be based on transmit network capabilities (e.g., bandwidth, latency, and/or jitter). The distributed RAN 200 may share features and/or components with LTE. For example, AN 208 may support dual connectivity with NR and may share a common fronthaul for LTE and NR. The distributed RAN 200 may enable cooperation between and among DUs 214-218, for example, via the CU-CP 212. An inter-DU interface may not be used.

Logical functions may be dynamically distributed in the distributed RAN 200. As will be described in more detail with reference to FIG. 3, the Radio Resource Control (RRC) layer, Packet Data Convergence Protocol (PDCP) layer, Radio Link Control (RLC) layer, Medium Access Control (MAC) layer, Physical (PHY) layers, and/or Radio Frequency (RF) layers may be adaptably placed, in the AN and/or UE.

Figure 3:
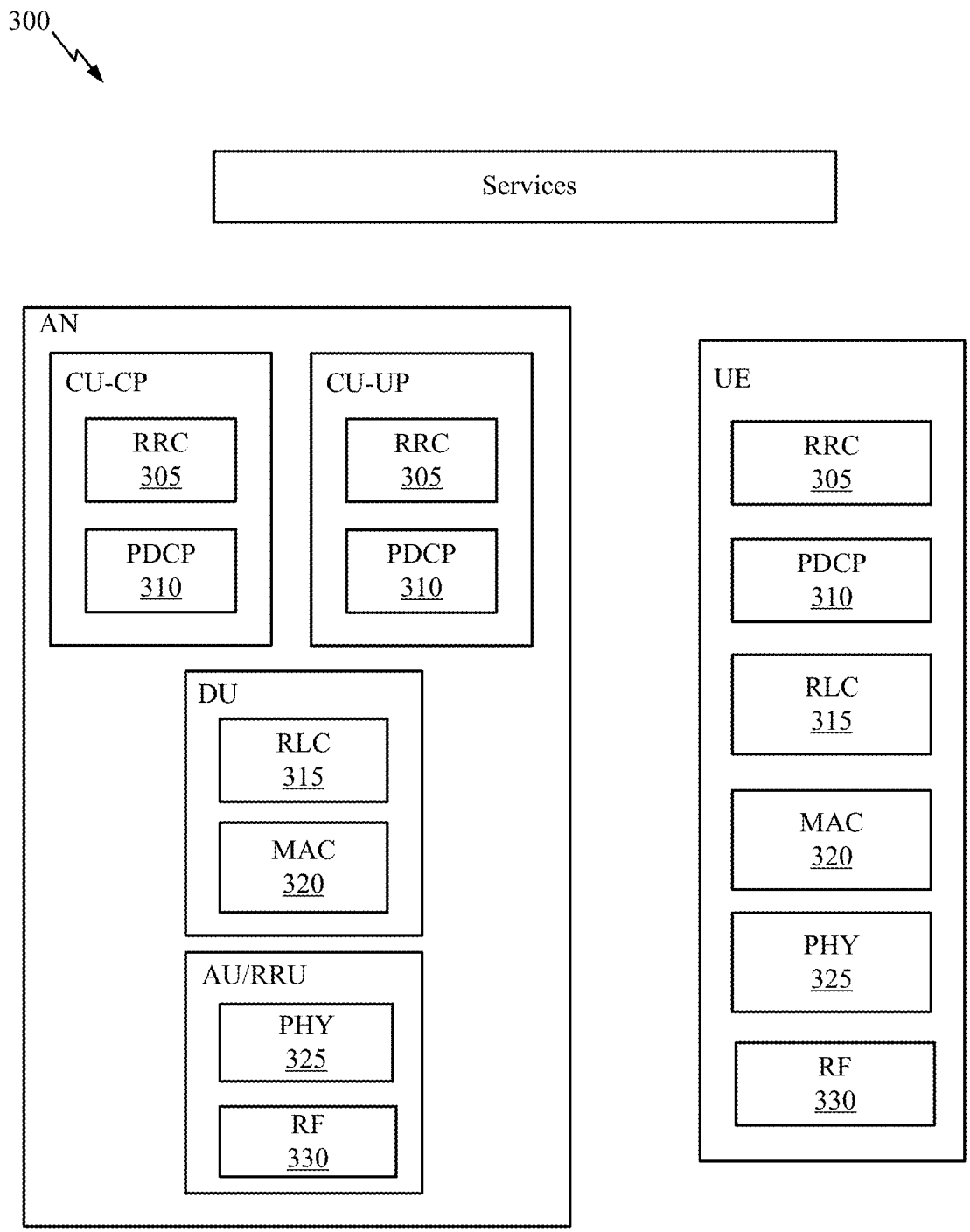
FIG. 3 is a block diagram showing examples for implementing a communication protocol stack in the example RAN architecture, in accordance with certain aspects of the present disclosure.

FIG. 3 illustrates a diagram showing examples for implementing a communications protocol stack 300 in a RAN (e.g., such as the RAN 200), according to aspects of the present disclosure. The illustrated communications protocol stack 300 may be implemented by devices operating in a wireless communication system, such as a 5G NR system (e.g., the wireless communication network 100). In various examples, the layers of the protocol stack 300 may be implemented as separate modules of software, portions of a processor or ASIC, portions of non-collocated devices connected by a communications link, or various combinations thereof. Collocated and non-collocated implementations may be used, for example, in a protocol stack for a network access device or a UE. As shown in FIG. 3, the system may support various services over one or more protocols. One or more protocol layers of the protocol stack 300 may be implemented by the AN and/or the UE.

As shown in FIG. 3, the protocol stack 300 is split in the AN (e.g., AN 208 in FIG. 2). The RRC layer 305, PDCP layer 310, RLC layer 315, MAC layer 320, PHY layer 325, and RF layer 530 may be implemented by the AN. For example, the CU-CP (e.g., CU-CP 210 in FIG. 2) and the CU-UP e.g., CU-UP 212 in FIG. 2) each may implement the RRC layer 305 and the PDCP layer 310. A DU (e.g., DUs 214-218 in FIG. 2) may implement the RLC layer 315 and MAC layer 320. The AU/RRU (e.g., AU/RRUs 220-224 in FIG. 2) may implement the PHY layer(s) 325 and the RF layer(s) 330. The PHY layers 325 may include a high PHY layer and a low PHY layer.

The UE may implement the entire protocol stack 300 (e.g., the RRC layer 305, the PDCP layer 310, the RLC layer 315, the MAC layer 320, the PHY layer(s) 325, and the RF layer(s) 330).

Figure 4:
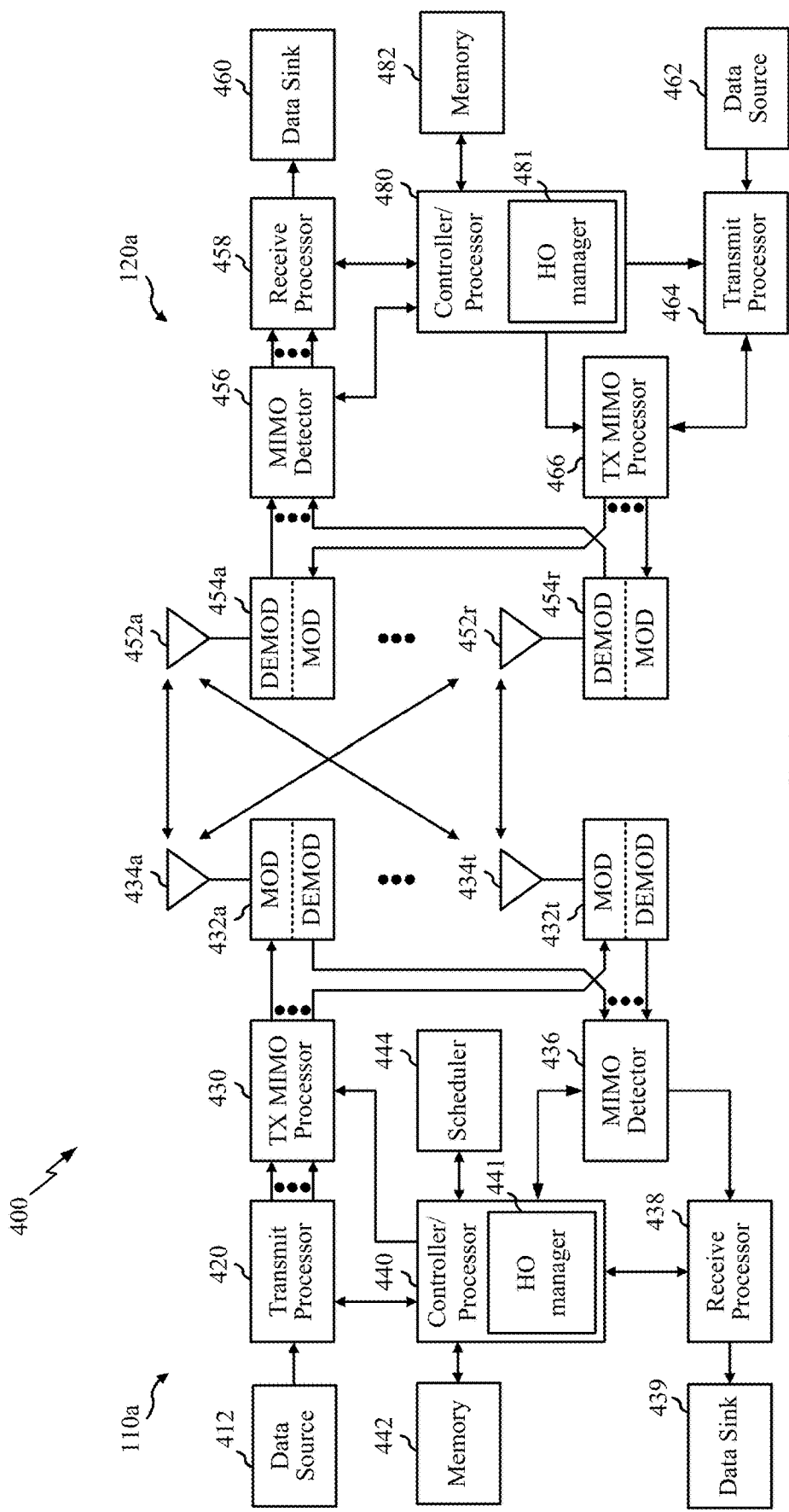
FIG. 4 is a block diagram conceptually illustrating a design of an example BS and user equipment (UE), in accordance with certain aspects of the present disclosure.

FIG. 4 shows a block diagram of a design of a BS 110a and a UE 120a. At the BS110a, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 440 may process (e.g., encode and symbol map) the data and control information to obtain data symbols and control symbols, respectively. The processor 420 may also generate reference symbols, e.g., for the PSS, SSS, and channel state information reference signal (CSI-RS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120a, the antennas 452a through 452r may receive the downlink signals from the BS 110a and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120a to a data sink 460, and provide decoded control information to a controller/processor 480.

On the uplink, at the UE 120a, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the modulators 454a through 454r (e.g., for SC-FDM, etc.), and transmitted to the BS 110a. At the BS 110a, the uplink signals from the UE 120a may be received by the antennas 434, processed by the demodulators 432, detected by a MIMO detector 436 if applicable, and further processed by a receive processor 438 to obtain decoded data and control information sent by the UE 120a. The receive processor 438 may provide the decoded data to a data sink 439 and the decoded control information to the controller/processor 440.

The controllers/processors 440 and 480 may direct the operation at the BS 110a and the UE 120a, respectively. The processor 440 and/or other processors and modules at the BS 110 may perform or direct, such as the execution of various processes for the techniques described herein. As shown in FIG. 4, the processor 440 includes the HO manager 441 that may be configured for header compression handling during a handover in accordance with aspects of the disclosure. The processor 480 and/or other processors and modules at the UE 120a may also perform or direct. As shown in FIG. 4, the processor 480 includes the HO manager 481 that may be configured for header compression handling during a handover in accordance with aspects of the disclosure.

NR may utilize orthogonal frequency division multiplexing (OFDM) with a cyclic prefix (CP) on the downlink and/or uplink and single-carrier frequency division multiplexing (SC-FDM) on the uplink and/or downlink. OFDM and SC-FDM partition the system bandwidth into multiple orthogonal subcarriers, also referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may multiple resource blocks (RBs).

Figure 5:
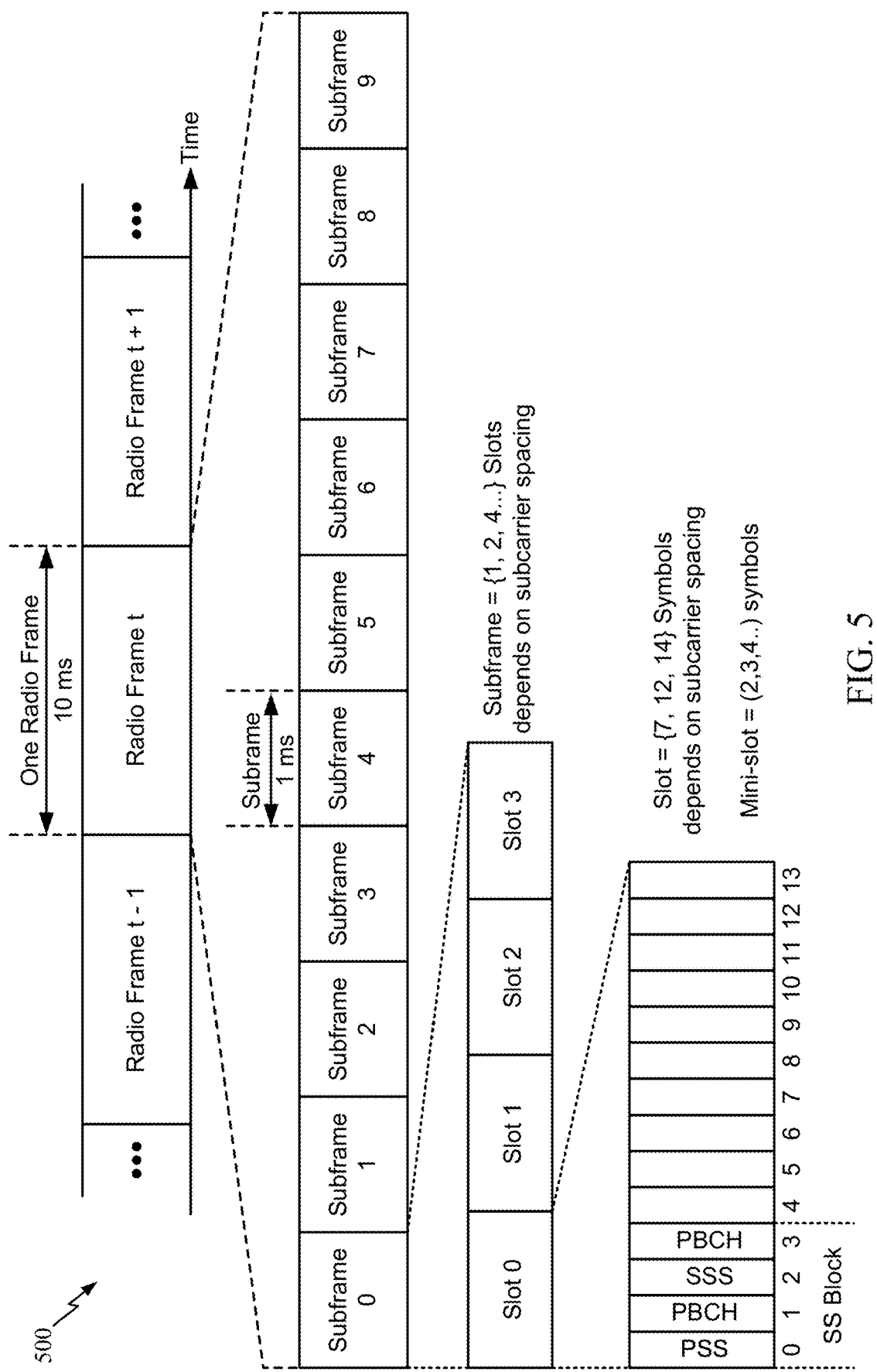
FIG. 5 illustrates an example of a frame format for a new radio (NR) system, in accordance with certain aspects of the present disclosure.

FIG. 5 is a diagram showing an example of a frame format 500 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity. Thus, in a wireless communication network with a scheduled access to time-frequency resources and having a cellular configuration, a P2P configuration, and a mesh configuration, a scheduling entity and one or more subordinate entities may communicate utilizing the scheduled resources.

Example Handover Scenarios

Some techniques and apparatuses described herein provide for low-latency or zero-latency handover from a source BS to a target base station (e.g., in a network such as a 4G/LTE or 5G/NR network). For example, some techniques and apparatuses described herein provide for configuration of the handover using a first protocol stack of the UE and a second protocol stack of the UE. The first protocol stack of the UE is used for communication with the first BS and the second protocol stack of the UE is used for communication with the second BS. In some examples, this may be referred to as a make-before-break (MBB) handover or a dual active protocol stack (DAPS) handover. The use of the two protocol stacks may enable configuration of handover with regard to the target BS to be performed while communication with the source BS is ongoing. Thus, a latency associated with handing over the UE from the source BS to the target BS is reduced. Furthermore, some techniques and apparatuses described herein may provide for buffering and backhauling of UE traffic between the source BS and the target BS so that a flow of traffic to the UE is not interrupted (or so that interruption is reduced or minimized), thereby further reducing latency associated with handing over the UE. In this way, service levels at the UE may be satisfied in the case of handover of the UE, which allows for satisfaction of performance requirements for certain types of traffic (e.g., gaming traffic, multimedia traffic, high-reliability traffic, low-latency traffic, etc.).

Some techniques and apparatuses described herein may provide a common packet data convergence protocol (PDCP) function for the handover procedure, which may streamline security key management, ciphering/deciphering, integrity protection, integrity verification, data unit reordering/duplicate discarding, link selection logic, and/or the like. Some techniques and apparatuses described herein provide control-plane (e.g., BS, network controller, control entity, etc.) messaging and handling to support the handover. Some techniques and apparatuses described herein provide for a handover using a carrier aggregation (CA) multiple-input multiple-output (MIMO) technique, wherein a diminished MIMO configuration is signaled to cause at least one antenna to be available for use for the MBB handover. Still further, some techniques and apparatuses described herein provide a role switch-based handover technique, wherein a master cell group of the UE is switched from the source base station to the target base station while connections with the source base station and the target base station are active. In this way, low-latency or zero-latency handover (and the benefits described above in connection with low-latency or zero-latency handover) are realized.

Figure 6:
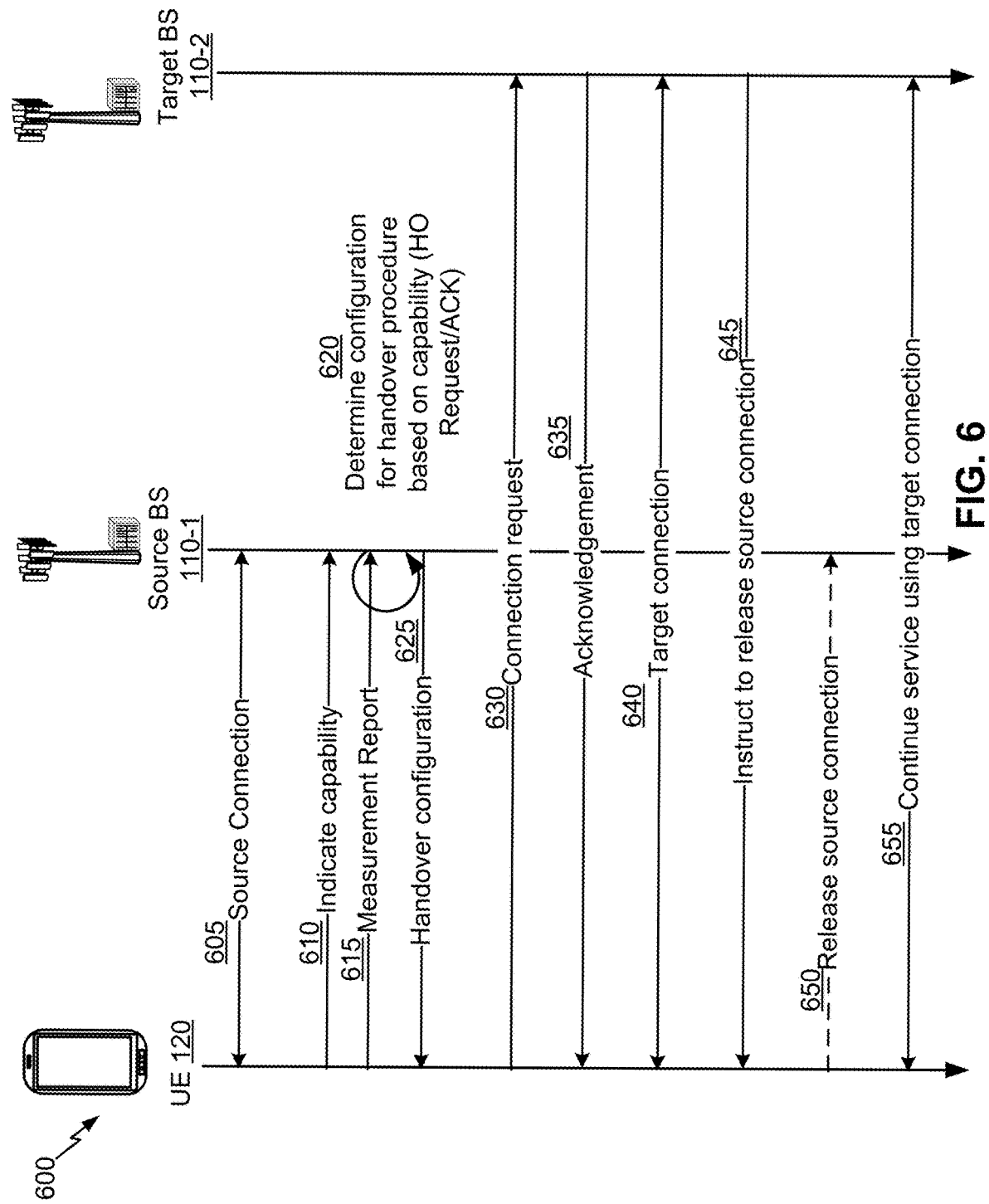
FIG. 6 illustrates a call flow diagram of an example handover procedure.

FIG. 6 is a diagram illustrating an example 600 for a handover procedure of a radio access network, in accordance with various aspects of the present disclosure. As shown in FIG. 6, a UE 120 is handed over from a source BS 110-1 to a target BS 110-2. The source BS 110-1 and target BS 110-2 may be implemented by BS 110a of FIG. 1. The handover described in connection with FIG. 6 may be intra-frequency or inter-frequency and/or may be intra-CU or inter-CU.

As shown in FIG. 6 and by reference number 605, UE 120 has established a connection with source BS 110-1 (hereinafter referred to as a source connection). As shown by reference number 610, in example 600, UE 120 indicates a capability of the UE 120 to any one or more of source BS 110-1, target BS 110-2, a network entity such as an access management function, and/or the like. For example, UE 120 may indicate that the UE 120 has simultaneous transmit and receive capability and/or dual connectivity capability.

As shown by reference number 615, UE 120 may provide a measurement report to source BS 110-1. The measurement report may indicate that a handover is to be performed from the source BS 110-1 to a target BS 110-2. As shown by reference number 620, source BS 110-1 may determine a configuration for a handover procedure based at least in part on the capability. For example, source BS 110-1 may provide a handover request to target BS 110-2, and may receive a handover acknowledgment (ACK) from target BS 110-2. In some aspects, source BS 110-1 may communicate with target BS 110-2 to determine a handover configuration for UE 120. Source BS 110-1, as shown by reference number 625, may then provide the handover configuration to the UE 120. For example, the handover configuration may include a configuration for a handover procedure that utilizes or does not utilize the indicated capability of the UE 120. In some aspects, the handover configuration may indicate that a make-before-break (MBB) handover procedure, a DAPS handover procedure, and/or a DC-based MBB handover procedure is performed. Thus, UE 120 may know to maintain the source connection while and/or after the target connection is established.

As further shown in FIG. 6, and by reference number 630, UE 120 requests to connect with target BS 110-2 (e.g., using the configuration received from source BS 110-1). For example, UE 120 may perform a random access procedure to establish a connection with target BS 110-2 (hereinafter referred to as a target connection). Target BS 110-2, as shown by reference number 635, may reply with an acknowledgment and UE 120 and target BS 110-2 may establish the target connection, as shown by reference number 640. As is evident in example 600, UE 120 may concurrently maintain both a source connection with source BS 110-1 and target BS 110-2 during the handover process. In such cases, because UE 120 maintains an active connection with both source BS 110-1 and target BS 110-2 for a period of time, UE 120 may experience decreased delays relative to previous techniques and/or minimal data interruption time (e.g., 0 ms handover).

As further shown in FIG. 6, and by reference number 645, target BS 110-2 instructs UE 120 to release the source connection (e.g., to complete the handover). For example, once it is determined that the UE 120 has established a strong connection (e.g., a measured parameter by UE 120 satisfied a threshold indicating a strong connection), target BS 110-2 may send an instruction to complete the handover. In some aspects, the release of the source connection may not be based on an instruction from target BS 110-2. For example, UE 120 may release the source connection may be based at least in part on the establishment of the target connection. In some aspects, the release of the source connection may be based on an instruction from the source BS 110-1, based at least in part on receiving an indication of establishment of the target connection from the target BS 110-2 or from the UE 120. Accordingly, as shown by reference number 650, UE 120 releases the source connection to source BS 110-1. Further, as shown by reference number 655, UE 120 continues service using the target connection with target BS 110-2.

Accordingly, as shown by example 600 in FIG. 6, a UE may provide a capability to a BS or network entity and the BS may configure an MBB handover procedure for the UE to enable the UE to use the capability during the handover procedure. Therefore, a UE may achieve enhanced performance during a handover procedure and may experience minimal mobility interruption time (e.g., via a 0 ms handover) relative to a handover procedure that does not take advantage of the capability of the UE.

As indicated above, FIG. 6 is provided as an example. Other examples may differ from what is described with respect to FIG. 6.

Figure 7:
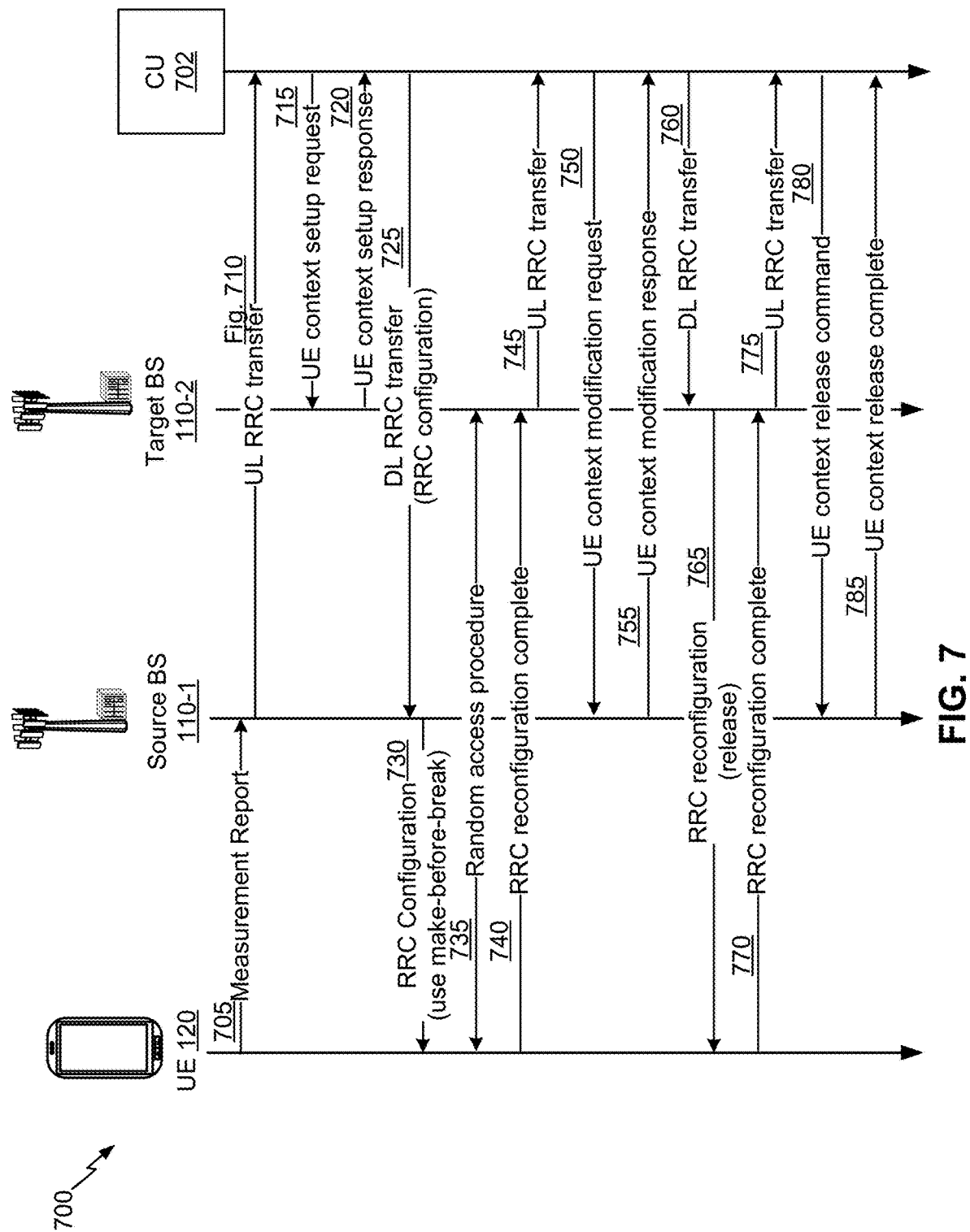
FIG. 7 illustrates a call flow diagram of another example handover procedure.

FIG. 7 is a diagram illustrating an example 700 for a handover procedure of a radio access network, in accordance with various aspects of the present disclosure. As shown in a call flow of the example 700 of FIG. 7, an example intra-CU handover procedure is performed, using an enhanced MBB or DAPS handover, in which both a source BS 110-1 and a target BS 110-2 are associated with a same CU 702.

In FIG. 7, UE 120, prior to the beginning of the call flow, may be exchanging user data (e.g., uplink user data and/or downlink user data) with CU 702 via source BS 110-1. As shown by reference number 705, UE 120 sends a measurement report to the source BS 110-1. In some aspects, UE 120 sends the measurement report based at least in part on an event trigger (e.g., a signal measurement that satisfies a threshold) associated with determining that a handover procedure is to be initiated. The UE 120 may be associated with a capability for a handover. For example, the capability may be a simultaneous transmit and receive capability that allows UE 120 to concurrently transmit and receive data and/or information. In such a case, UE 120 may establish a plurality of connections with a plurality of different BSs (e.g., with source BS 110-1 and target BS 110-2).

As further shown in FIG. 7, and by reference number 710, source BS 110-1 sends an uplink (UL) radio resource control (RRC) transfer to CU 702. In some aspects, the UL RRC transfer can include the measurement report. Furthermore, in some aspects, the UL RRC transfer can cause CU 702 to determine a handover configuration that is to be used for a handover procedure for UE 120. For example, CU 702 may select from possible handover procedures that may be performed by UE 120 based at least in part on the indicated capability of UE 120. In some aspects, CU 702 may select an enhanced MBB or DAPS handover procedure for UE 120 based at least in part on UE 120 indicating a simultaneous transmit and receive capability.

As further shown in FIG. 7, and by reference number 715, CU 702 sends a UE context setup request to target BS 110-2. For example, CU 702 may send the UE context setup request to indicate to target BS 110-2 that UE 120 is to be handed over to target BS 110-2 during a handover procedure. As shown by reference number 720, target BS 110-2 sends a UE context setup response. For example, target BS 110-2 may send the UE context setup response to acknowledge the request and/or indicate an ability to serve UE 120 after the handover procedure.

As further shown in FIG. 7, and by reference number 725, CU 702 sends a downlink (DL) RRC transfer to source BS 110-1. In some aspects, the DL RRC transfer can include a RRC reconfiguration message that indicates a configuration for a handover procedure in which UE 120 is to be handed over from source BS 110-1 to target BS 110-2. As shown by reference number 730, source BS 110-1 sends an RRC reconfiguration to UE 120. In some aspects, the RRC reconfiguration can include information identifying target BS 110-2, information identifying a handover configuration, and/or the like. For example, the RRC reconfiguration may indicate that UE 120 is to perform an enhanced MBB or DAPS handover procedure with target BS 110-2 using a simultaneous transmit and receive capability of UE 120. In such a case, UE 120 may identify and/or determine that UE 120 is to maintain a connection with source BS 110-1 while establishing a connection with target BS 110-2. As shown by reference number 735, UE 120 performs a random access procedure with target BS 110-2 (e.g., to initiate and/or to establish a connection with target BS 110-2). In some aspects, UE 120 can continue to exchange user data (e.g., uplink user data and/or downlink user data) with CU 702 via source BS 110-1 after the random access procedure.

As shown by reference number 740, UE 120 sends a RRC reconfiguration complete message to target BS 110-2. In some aspects, UE 120 may use a dual protocol stack, which includes a source protocol stack for communicating with source BS 110-1 and a target protocol stack for communicating with target BS 110-2. Each of these protocol stacks may include a packet data convergence protocol (PDCP) layer, a radio link control (RLC) layer, a medium access control (MAC) layer, and/or a physical (PHY) layer. In some aspects, the source protocol stack and the target protocol stack may share one or more layers, such as a common PDCP layer or entity (described in more detail elsewhere herein). In some aspects, the target protocol stack may be used for uplink data transmissions.

As shown by reference number 745, target BS 110-2 sends a UL RRC transfer to CU 702. For example, the UL RRC transfer may indicate the RRC reconfiguration is complete. Accordingly, in some aspects, based at least in part on receiving the RRC reconfiguration complete message, CU 702 may determine a handover completion configuration. For example, when making a completion determination, CU 702 can utilize and/or configure one or more thresholds for one or more measurement parameters to perform a handover completion procedure (e.g., to release source BS 110-1). Furthermore, in some aspects, after the RRC reconfiguration is complete, UE 120 may perform uplink user/control plane duplication with source BS 110-1 and CU 702. For example, control plane data may be duplicated and shared between BS 110-1 and CU 702. Furthermore, in some aspects, after the CU 702 determines the RRC reconfiguration is complete, CU 402 can send downlink user data via target BS 110-2, but continue to send downlink user/control plane duplication via source BS 110-1. Accordingly, UE 120 may achieve improved reliability when receiving the data on the downlink.

As shown by reference number 750, CU 702 sends a UE context modification request to source BS 110-1. For example, the UE context modification request may include a transmission stop indicator to indicate that source BS 110-1 is to be released from serving UE 120. In some aspects, source BS 110-1 may provide a downlink data delivery status to CU 702. As shown by reference number 755, source BS 110-1 sends a UE context modification response to CU 402. For example, the UE context modification response may include an acknowledgement that source BS 110-1 is to be released during the handover procedure and/or is to no longer serve UE 120.

As further shown in FIG. 7, and by reference number 760, CU 702 sends a DL RRC transfer to target BS 110-2. For example, the DL RRC transfer to target BS 110-2 may include an RRC reconfiguration message indicating that the handover procedure is to be completed. As shown by reference number 765, target BS 110-2 sends an RRC reconfiguration to UE 120. For example, the RRC reconfiguration message may indicate that UE 120 is to release a connection with source BS 110-1. As such, UE 120 may release the connection with source BS 110-1, based at least in part on receiving the RRC reconfiguration message. Furthermore, UE 120 may then begin exchanging uplink user data and downlink user data with CU 702 via target BS 110-2.

As shown by reference number 770, UE 120 may send a RRC reconfiguration complete message to target BS 110-2. In some aspects, the RRC reconfiguration complete message may indicate that UE 120 has released the connection with source BS 110-1. As shown by reference number 775, target BS 110-2 may send a UL RRC transfer to CU 702. In some aspects, the UL RRC transfer may indicate that the RRC reconfiguration complete message was received from UE 120. As shown by reference number 780, CU 702 may then send a UE context release command to source BS 110-1 (e.g., so that source BS 110-1 does not continue to attempt to serve UE 120). As shown by reference number 785, source BS 110-1 sends a UE context release complete message to 7U 402. For example, the UE context release complete message may be an acknowledgement that source BS 110-1 is no longer in communication with and/or serving UE 120.

As indicated above, FIG. 7 is provided as an example. Other examples may differ from what is described with respect to FIG. 7.

Example Header Compression

Robust Header Compression (RoHC) is a header compression protocol that may be used to improve bandwidth efficiency (e.g., for VoLTE operations). While an uncompressed VoIP packet may include between 24 and 60 bits for header information and a payload of 32-33 bytes depending on a coding standard, a VoIP packet with RoHC compression may use a 3-4 byte header. With RoHC compression, headers of the data packets in the data stream may be compressed to reduce overhead during transmission by removing certain contextual information from the packet header. In other words, because information may not change for some time (e.g., for a duration VoLTE call), the packet header may be compressed by removing this information.

To establish a stream of data packets between a RoHC compressor and a RoHC decompressor, the compressor and the decompressor may first establish a context for the data stream. The context is the state that the compressor and the decompressor maintain in order to correctly compress or decompress the headers of the packets in the stream. Each context is identified using a context identifier (CID). The context may include information from previous headers in data stream, such as static fields and reference values for compression and decompression. The context may further include information indicating the change behavior of dynamic values, such as, for example, an inter-packet increase in sequence number or timestamps. A value may be associated with the CID, where the value may identify a state to be maintained by a corresponding compressor and decompressor to compress and decompress, respectively, the data contained in the data stream. Context information is conceptually kept in a table, and this table is indexed using the CID value, which is sent along with compressed headers and feedback information.

Accordingly, all RoHC packet types have a header format containing the following: an optional Add-CID octet (which includes 4 bits of CID); an octet with the ROHC packet type and indication; one or two octets of CID; and the body of the packet. The RoHC headers can either start with a packet type indication or have a packet type indication immediately following an Add-CID octet. When the RoHC channel is configured with a small CID space, if the Add-CID immediately precedes the packet type indication, the packet has the CID of the Add-CID; otherwise, the packet has CID 0. The packet type indication specifies the type of the packet, such as RTP, RTCP, TCP, etc.

While the present disclosure discusses RoHC specifically, this disclosure can be applied to other types of header compression protocols, such as Ethernet header compression protocol or any other header compression protocol.

In an example RoHC compression scheme, a UE as the compressor may be participating in a communication session with a BS as the decompressor, and may transmit an initial packet to the base station in a data packet stream. The initial packet may be a media data packet including as a payload, for example, video data or voice data. The packet may include a compressed header containing various information, including CID and packet type. In another example compression scheme, the BS as the compressor may transmit the initial packet in the data packet stream to the UE as the decompressor.

In the example implementation, a compressor-decompressor pair maintains a context at each side for each packet stream. The context for each packet stream is identified by the same CID at the compressor and the decompressor. The context includes information from previous headers in the packet stream and other possible reference values for compression and decompression. Data describing the packet stream, such as information about how an IP Identifier field changes and inter-packet increases in sequence number or timestamp is also contained in a context.

Initially, a compressor and decompressor may not have an agreement on compressing or decompressing a certain packet stream. A compressor may send RoHC packets having static and dynamic information, including the CID, about a packet stream to the decompressor to establish a context. Once both static and dynamic fields are set up, a compressor need only send minimal information to advance the regular sequence of compressed header fields.

In some systems (e.g., NR Release 15 systems), on receiving a handover message, the UE detaches from source cell and stops data transmission on the source cell while synchronizing to the target cell. If the handover is an inter-gNB handover, then the packet data convergence protocol (PDCP) entity may re-established (e.g., due to PDCP termination point change). A field in the handover message (e.g., drb-ContinueROHC) may indicate whether the PDCP entity continues or resets the ROHC header compression protocol during PDCP re-establishment. The field may be configured in the case of reconfiguration with synchronization where the PDCP termination point is not changed and the full configuration is not indicated.

When a PDCP entity is re-established, the ROHC context is typically reset. For example, the ROHC context may be reset due to a PDCP anchor change (e.g., a security key change). In the MBB or DAPS scenarios described above, PDCP entity re-establishment may be eliminated during handover by supporting separate PDCP entities on the network side and a common PDCP entity on the UE side. This may help to minimize the impact to the mobility interruption time during the handover. A user plane radio protocol architecture with a common PDCP entity on the UE during handover may eliminate the PDCP re-establishment.

Example Header Compression Handling During Handover

Aspects of the present disclosure provide techniques for header compression protocol (e.g., such as robust header compression (ROHC) protocol, or other types of header compression) handling during scenarios where a user equipment (UE) has multiple connections, such as during a make-before-breaker (MBB) handover (e.g., as described in the example scenarios above with respect to FIG. 6 and FIG. 7), a dual active protocol stack (DAPS) handover, or a dual connectivity scenario. As will be described below, aspects of the present disclosure enable the continued use of an ROHC context without reset. The techniques described herein may be applied in a common packet data convergence protocol (PDCP) entity during MBB or DAPS handover, as well as in dual connectivity scenarios, including Dual Connectivity Role Switch (DCRS) based handover, or even regular dual connectivity scenarios. The techniques may be applied in various deployments (e.g., in 5G/new radio (NR) and/or long term evolution (LTE) systems).

Figure 8:
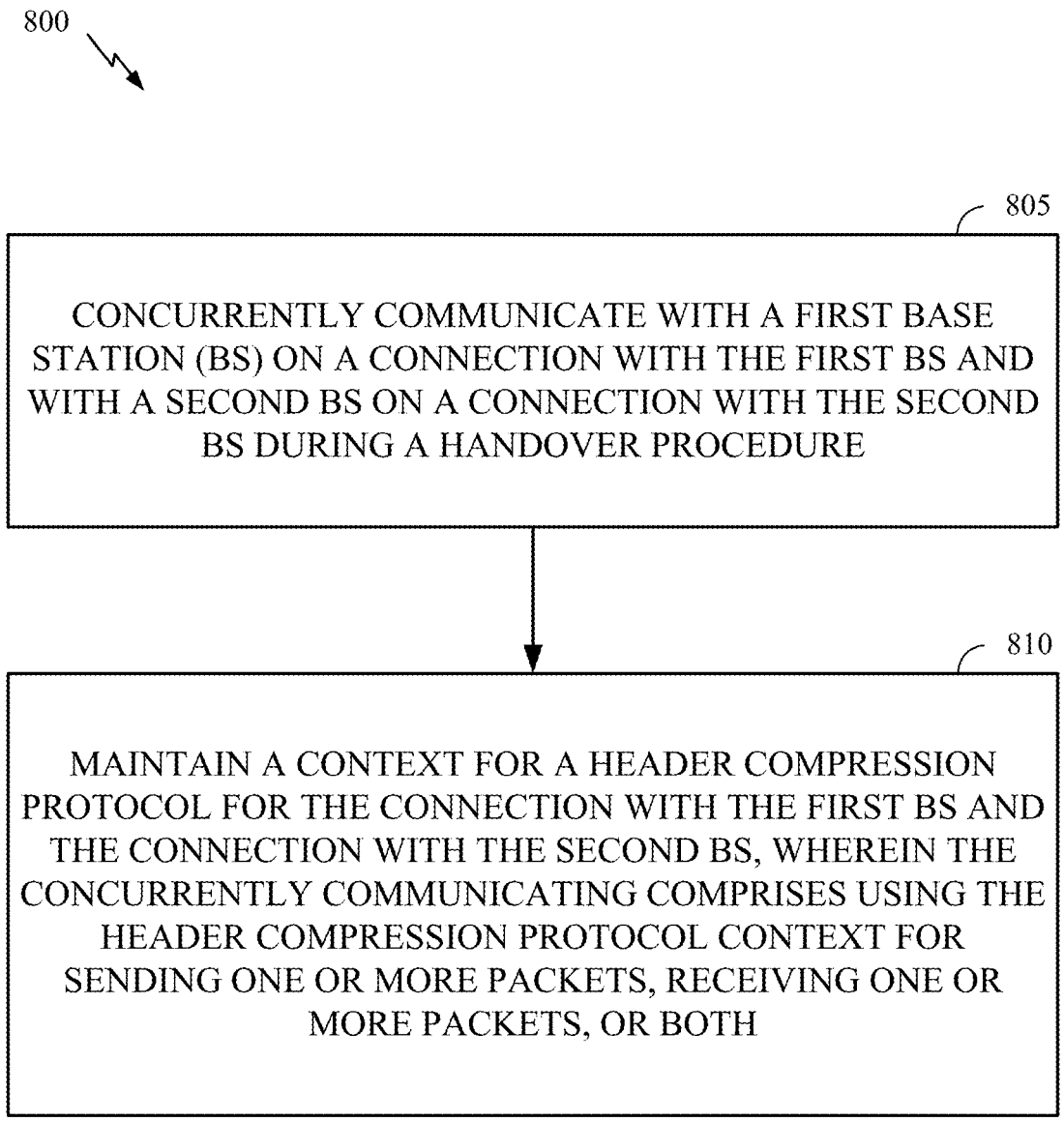
FIG. 8 illustrates example operations for wireless communication by a user equipment (UE), in accordance with certain aspects of the present disclosure.

FIG. 8 illustrates example operations 800 that may be performed as part of a header compression handling approach, in accordance with certain aspects of the present disclosure. Operations 800 may be performed, for example, by a UE (e.g., the UE 120a in the wireless communication network 100). The operations 800 may be implemented as software components that are executed and run on one or more processors (e.g., controller/processor 480 of FIG. 4). Further, the transmission and reception of signals by the UE in operations 800 may be enabled, for example, by one or more antennas (e.g., antennas 452 of FIG. 4). In certain aspects, the transmission and/or reception of signals by the UE may be implemented via a bus interface of one or more processors (e.g., controller/processor 480) obtaining and/or outputting signals.

Operations 800 begin, at 805, by concurrently communicating with a first base station (BS) on a connection with the first BS and with a second BS on a connection with the second BS.

At 810, the UE maintains a context for a header compression protocol for the connection with the first BS and the connection with the second BS. The concurrently communicating includes using the header compression protocol context for sending one or more packets, receiving one or more packets, or both.

Figure 9:
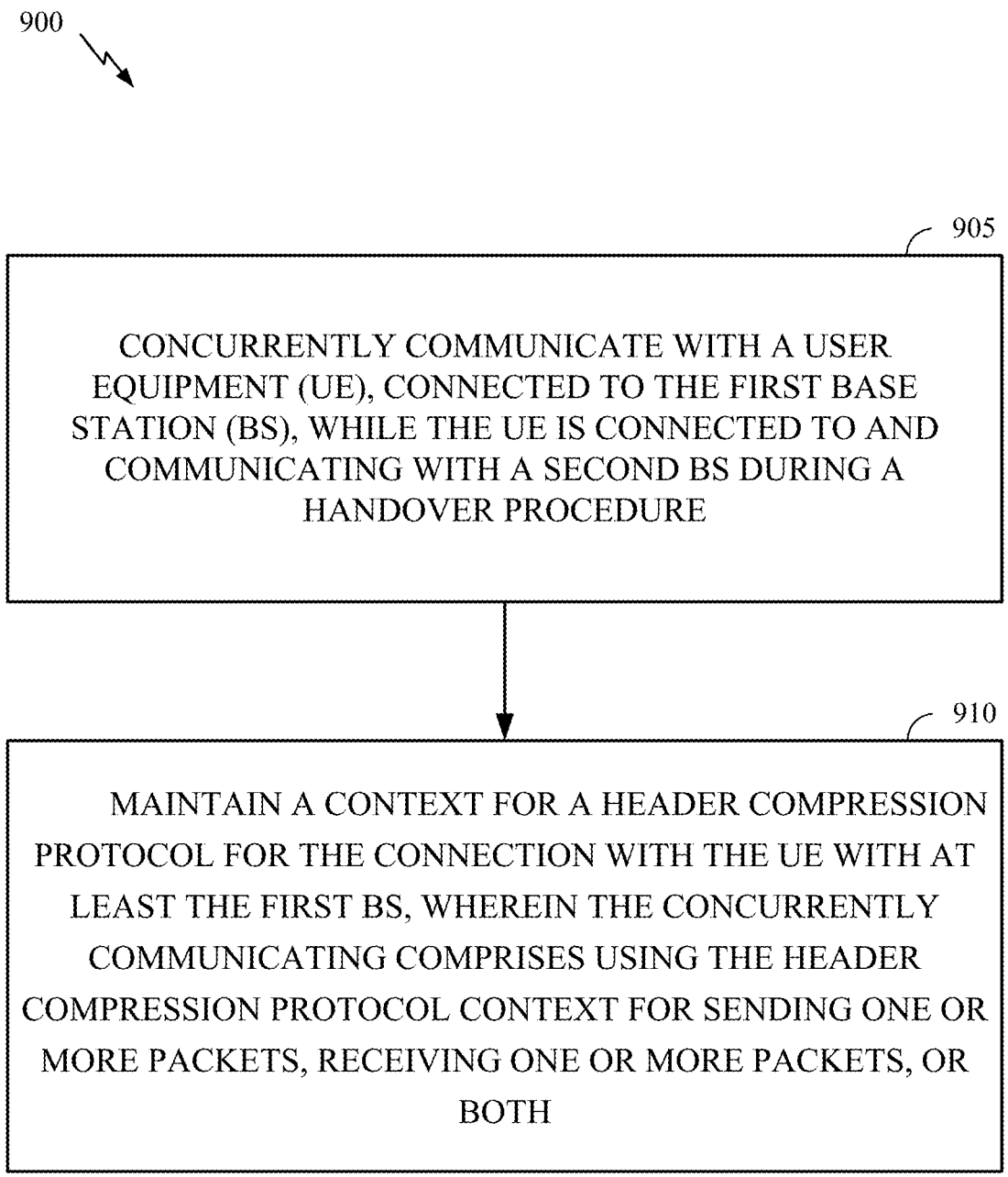
FIG. 9 illustrates example operations for wireless communication by a network entity, in accordance with certain aspects of the present disclosure.

FIG. 9 illustrates example operations 900 that may be performed as part of a RACH procedure, in accordance with certain aspects of the present disclosure. Operations 900 may be performed by a networked entity, such as a first BS (e.g., the BS 110a in the wireless communication network 100). The operations 900 may be complimentary to the operations 800 performed by the UE. The operations 900 may be implemented as software components that are executed and run on one or more processors (e.g., controller/processor 440 of FIG. 4). Further, the transmission and reception of signals by the BS in operations 900 may be enabled, for example, by one or more antennas (e.g., antennas 434 of FIG. 4). In certain aspects, the transmission and/or reception of signals by the BS may be implemented via a bus interface of one or more processors (e.g., controller/processor 440) obtaining and/or outputting signals.

Operations 900 begin, at 905, by concurrently communicating with a UE, connected to the first BS while the UE is connected to and communicating with a second BS.

At 910, the base station maintains a context for a header compression protocol for the connection with at least the first BS. The concurrently communicating includes using the header compression protocol context for sending one or more packets, receiving one or more packets, or both.

According to certain aspects, in case of handover (e.g., MBB or DAPS handover), once the target link is setup, but the source connection is not yet released, the UE may sends uplink data with duplication of uplink data using a single active compressor context (e.g., for ROHC) in the UE and network. Alternatively, the UE may send uplink data with duplication of the uplink data on both. In the case duplication, the UE may support ROHC dual contexts or single context. With or without duplication, the UE may at least temporarily disable ROHC (e.g., in initialization and refresh (IR) state/mode).

Figure 10:
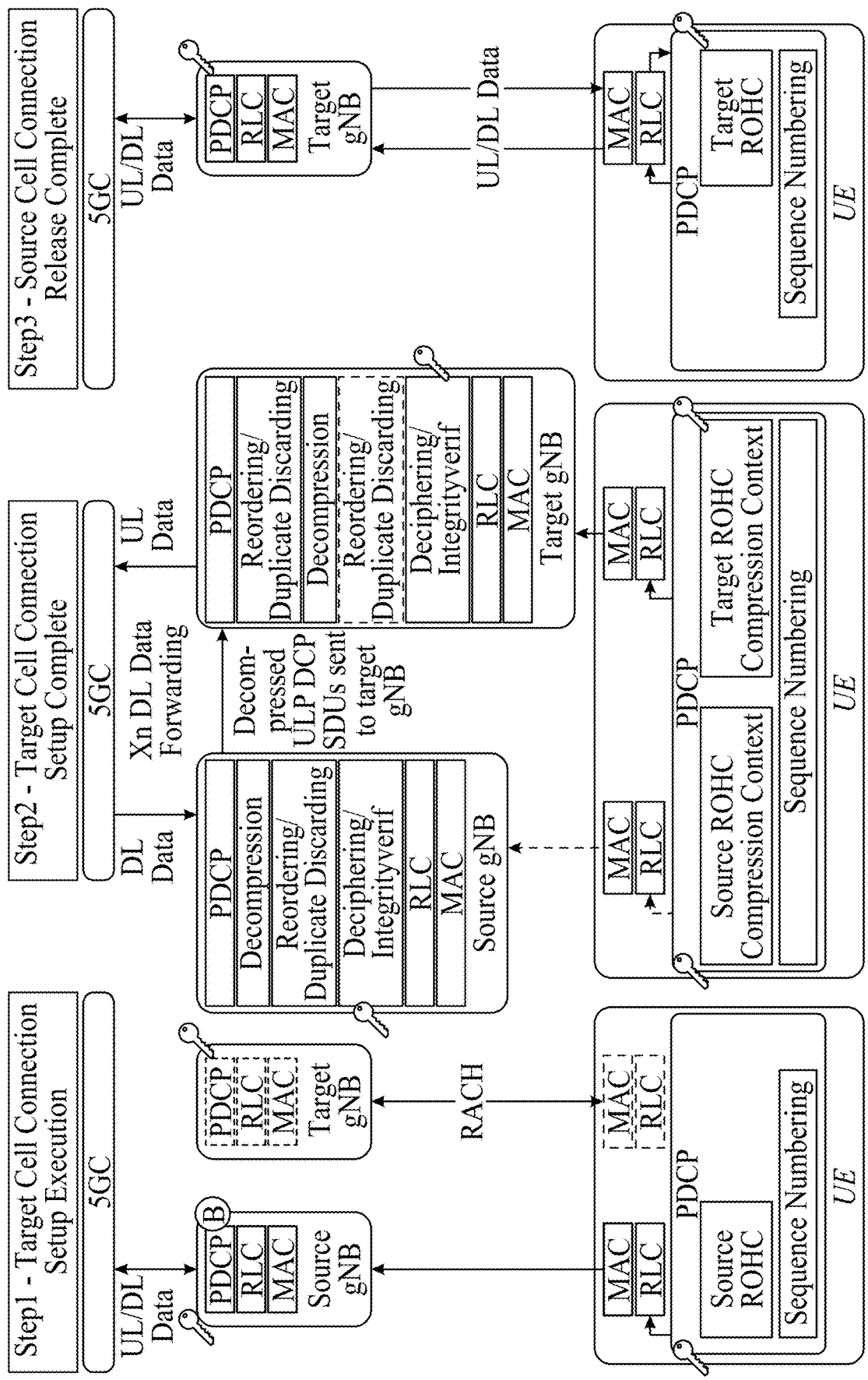
FIG. 10 is an example showing user plane architecture showing header compression with uplink data duplication and with dual contexts during handover in a wireless communication network, in accordance with aspects of the present disclosure.

Example Header Compression with UL Data Duplication and Dual Contexts During Handover FIG. 10 illustrates header compression handling with data duplication for uplink transmission with header compression (e.g., ROHC) with dual contexts in the UE. As illustrated in FIG. 10, in a first step (Step 1), the target cell connection setup is executed. In a second step (Step 2), the target cell connection setup is complete. In a third step (Step 3), the source cell connection release is complete.

As illustrated in FIG. 10, separate keys may be used for the connections to the source and target cells during the concurrent connection stage. As shown in FIG. 10, after the connection to the target cell (at Step 2) but before release of the source cell (at Step 3), the UE can communicate dual header compression contexts. For example, dual ROHC contexts are maintained on the UE for each link independently at the common PDCP entity. In some cases, to enable this mode, a PDCP protocol data unit (PDU) may be sent to the target cell from the UE to indicate dual ROHC context with duplication mode of operation. The PDCP PDU may be a control PDU or the PDCP PDU could be a data PDU with certain bits in the header set to indicate dual ROHC context with duplication mode of operation.

As shown in FIG. 10, the source gNB can forward downlink data to the target gNB (e.g., over an Xn interface). The source gNB can forward decompressed uplink data (e.g., uplink PDCP SDUs) to the target gNB.

As shown in FIG. 10, for uplink transmission, the UE can use the source ROHC compression context for communication on the link with the source BS and the UE can use the target ROHC compression for communication on the link the target BS. The target gNB may perform dual reordering/duplicate discarding after ROHC decompression as shown in FIG. 10. Alternatively, the target gNB may perform single reordering/duplicate discarding after the ROHC decompression for packets received from the source link and target link.

Figure 11:
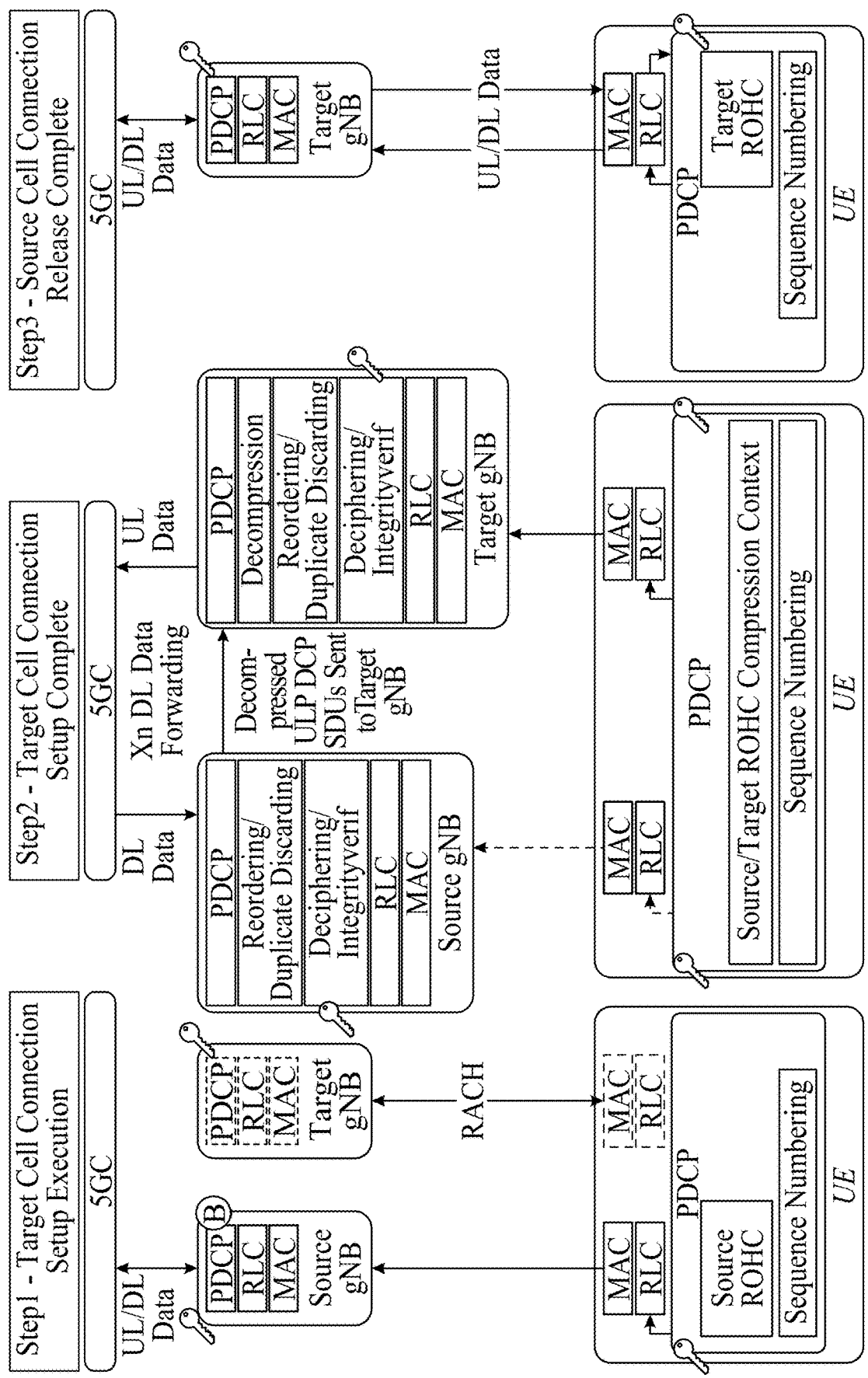
FIG. 11 is an example user plane architecture showing header compression with uplink data duplication and with single context during handover in a wireless communication network, in accordance with aspects of the present disclosure.

Example Header Compression with UL Data Duplication and Single Context During Handover FIG. 11 illustrates header compression handling with data duplication for uplink transmission with a single header compression context at the UE. As shown in FIG. 11, after the connection to the target cell (at Step 2) but before release of the source cell (at Step 3), the UE can communicate a single header compression context. For example, the common PDCP entity at the UE maintains either the source or the target gNB ROHC context.

As shown in FIG. 11, the source gNB does not decompress the uplink data (e.g., PDCP PDUs) received from after switching to single context mode of operation. The source gNBs forward the compressed uplink PDCP SDUs to the target gNB. In this example, the target gNB PDCP entity performs reordering/duplicate discarding for the forwarded UL PDCP PDUs from the source before performing decompression using the single ROHC context.

Figure 12:
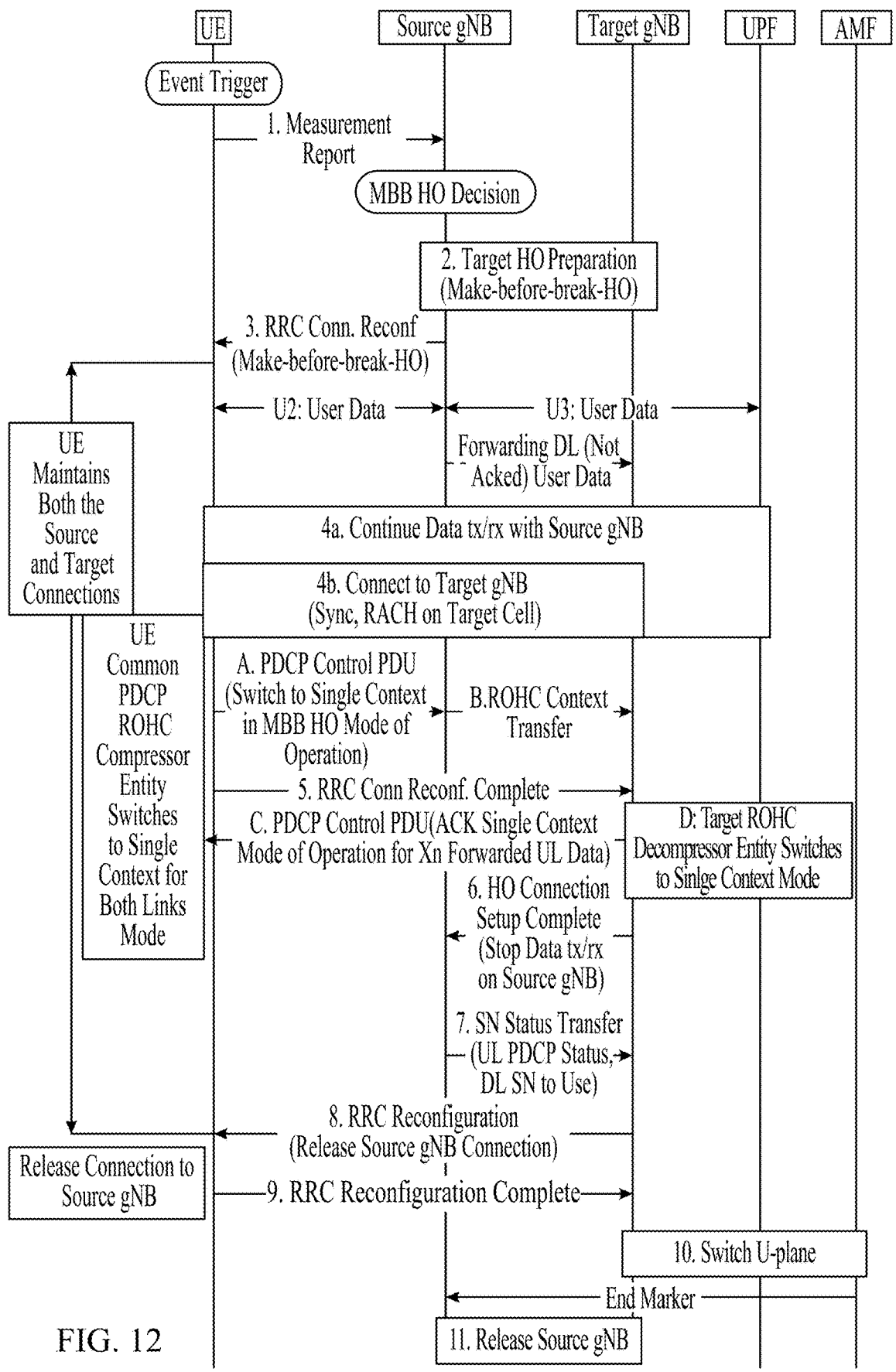
FIG. 12 is an example call flow showing header compression with uplink data duplication and with single context during handover in a wireless communication network, in accordance with aspects of the present disclosure.

FIG. 12 illustrates an example call flow diagram for header compression handling with data duplication and a single compression header context (e.g., as shown in FIG. 11). As shown in FIG. 12, after setting up the connection with the target gNB (e.g., at 4b), the UE indicates to the source and target cells to switch to "Single ROHC context mode with UL duplication". In some examples, the UE common PDCP entity ROHC compressor switches to the single context for ROHC compression for the links to the source and target gNBs. In some examples, the UE sends the indication in a PDCP control PDU, or in a PDCP header bits, after target link is setup to explicitly indicate to the source and target gNBs, at 5A. In some examples, the source gNB sends the ROHC context to the target gNB, at 5B. In some examples, the target gNB acknowledges the receipt of ROHC context and to initiate duplication by sending a PDCP control PDU, at 5C. In some examples, the target gNB starts single ROHC context decompression mode, at 5D.

Example Header Compression Disabling

According to certain aspects, the UE may switch to an initialization and refresh (IR) state of operation.

Figure 13:
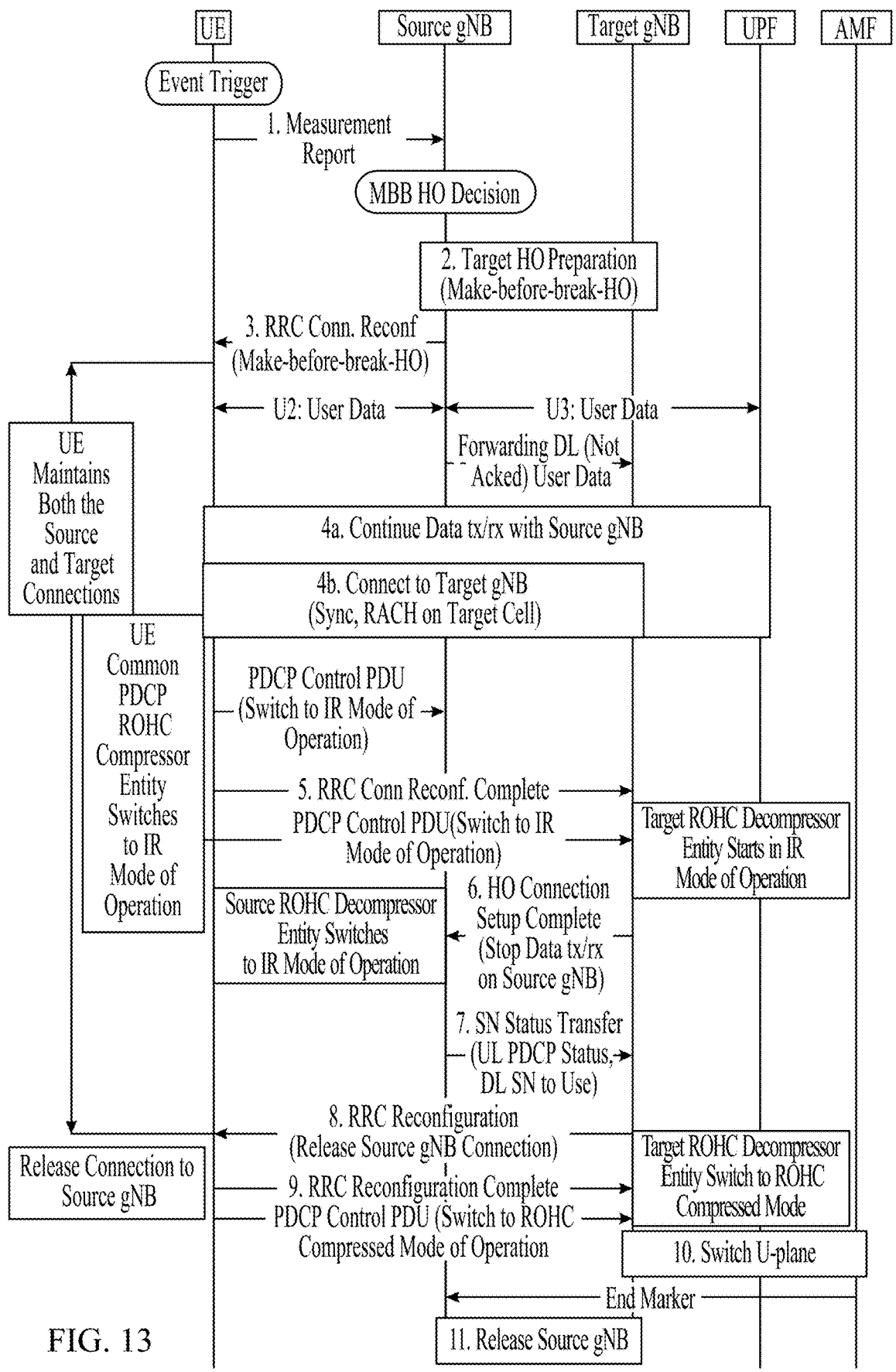
FIG. 13 is another example call flow showing header compression disabling during handover in a wireless communication network, in accordance with aspects of the present disclosure.

FIG. 13 an example call flow diagram for header compression handling in IR mode/state. In some examples, the header compression protocol may be disabled in the IR mode/state. As shown in FIG. 13, the common PDCP entity at the UE switches to the IR mode/state. During the handover, the UE indicates to the source and target gNBs to switch to the IR mode/state. In some examples, after target link is setup and before the source link is release, the UE may send a PDCP control PDU, or the PDCP header bits, to the source and target gNBs to explicitly indicate the IR mode/state. In some examples, the source and target gNBs determine the IR mode switch based on the handover messages. In some examples, the UE sends the PDCP control PDU to the source gNB before the target gNB link is set up. The source and target gNB header compression decompressor entities can then start the IR mode. In some examples, the UE sends the PDCP control PDU to the target gNB after the connection to the source gNB is released.

In some cases, a procedure can be used to disable ROHC temporarily, instead of switching to IR mode of operation. For example, the UE can send the PDCP control PDU to the source and target gNBs to indicate the disabling of the ROHC.

Example Header Compression Handling with Single Context and without DL Data Duplication According to certain aspects, the ROHC processing may be used for downlink communications during handover. During a handover, once the target link is setup and before the source connection is released, data duplication may not be used or may be used on both links. For downlink ROHC with data duplication, the UE and network may maintain dual/independent ROHC contexts. For downlink ROHC without data duplication, the UE may maintain a single context. In some examples, the UE may disable the ROHC in IR mode.

Figure 14:
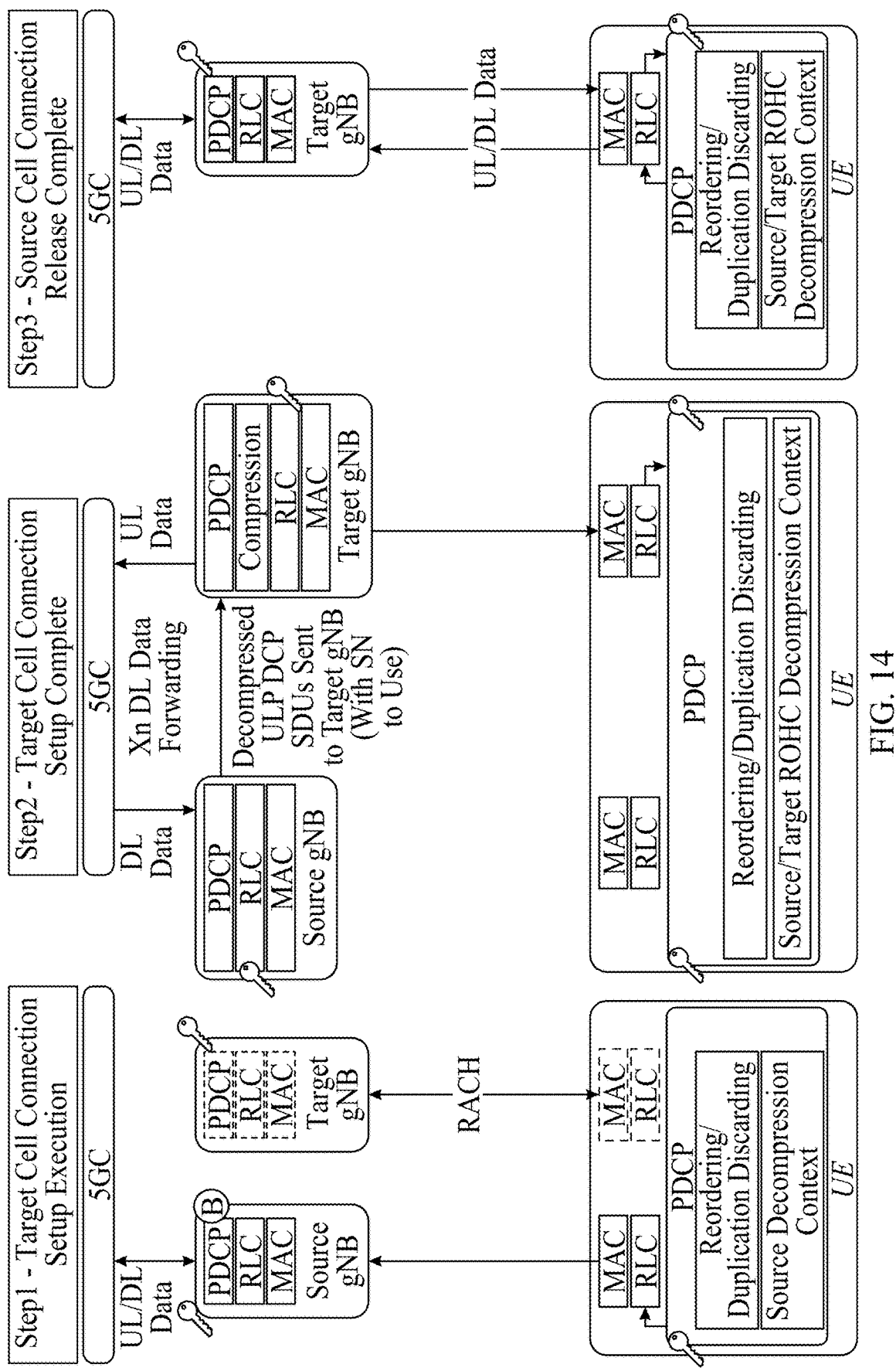
FIG. 14 is an example user plane architecture showing header compression without downlink data duplication and with single context during handover in a wireless communication network, in accordance with aspects of the present disclosure.
Figure 15:
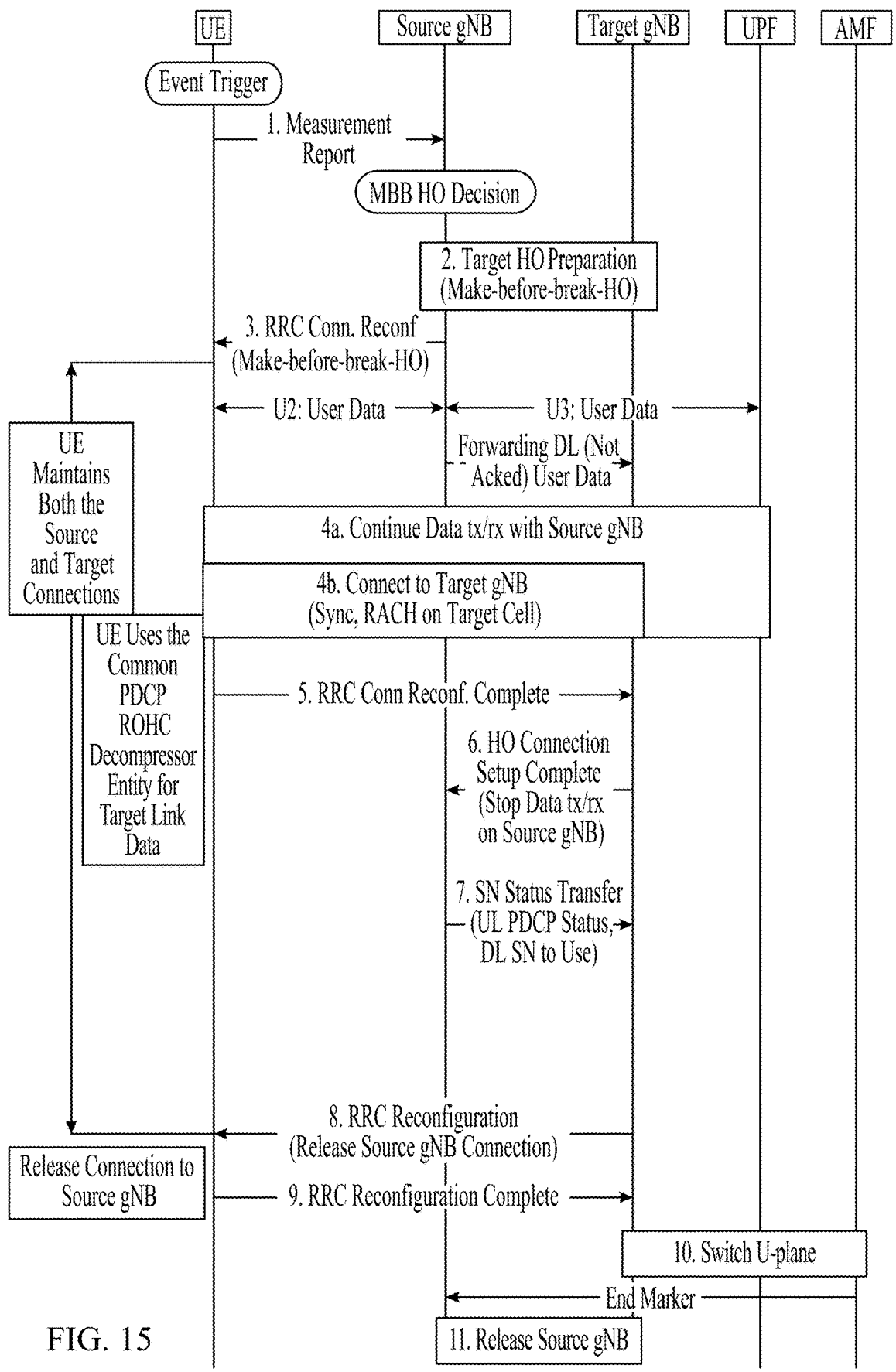
FIG. 15 is an example call flow showing header compression without downlink data duplication and with single context during handover in a wireless communication network, in accordance with aspects of the present disclosure.
Figure 16:
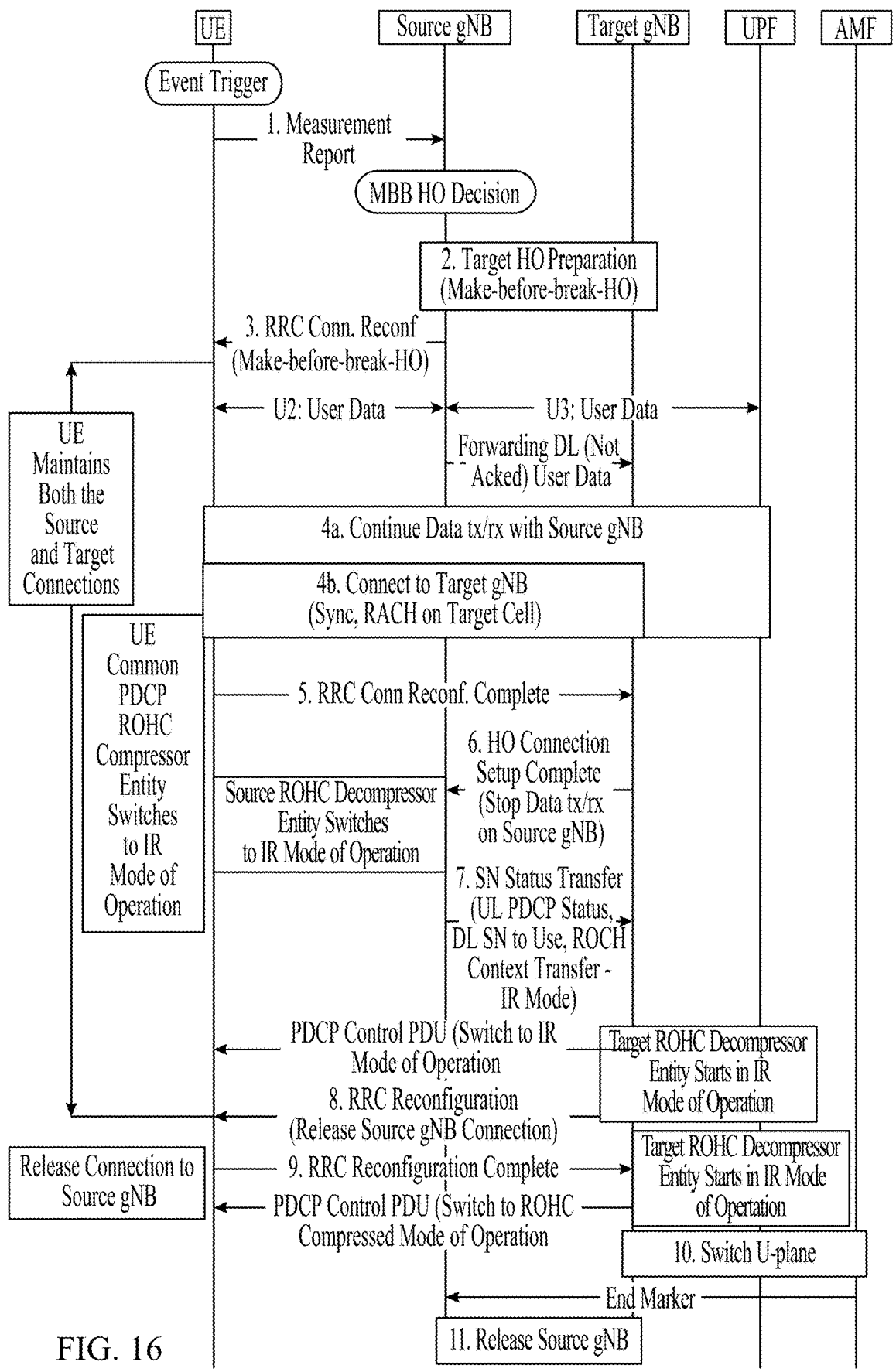
FIG. 16 is another example call flow showing header compression without downlink data duplication and with single context during handover in a wireless communication network, in accordance with aspects of the present disclosure.

FIG. 14 illustrates an example of header compression handling during handover with a single context in the UE for downlink header compression. As shown in FIG. 14, after setting up the connection with the target and cell before release the connection with the source cell, the UE maintains a single DL ROHC context at the common PDPC entity. For example, the UE can maintain the context of either the source gNB connection or the target gNB connection. The source gNB does not decompress the PDCP PDUs received after sending SN Status Transfer with ROHC context to the target gNB. As shown, the source gNB sends uncompressed UL PDPC SDUs to the target gNB. The UE uses the PDCP entity (e.g., a common PDCP entity as described above) to perform reordering/duplicate discarding and ROHC decompression of the DL PDUs received on target link. This approach may, thus, be seamless from UE standpoint. FIG. 15 illustrates an example call flow diagram for header compression handling during handover with a single context in the UE for downlink header compression (e.g., as shown in FIG. 14). FIG. 16 illustrates an example call flow diagram for header compression handling during handover with in IR/disabled mode.

Example Bearer Termination Point Change for Split Bearer

The techniques described herein may be applied to other scenarios, including dual connectivity scenarios involving split bearers (e.g., with links to both target and source gNBs).

Figure 17:
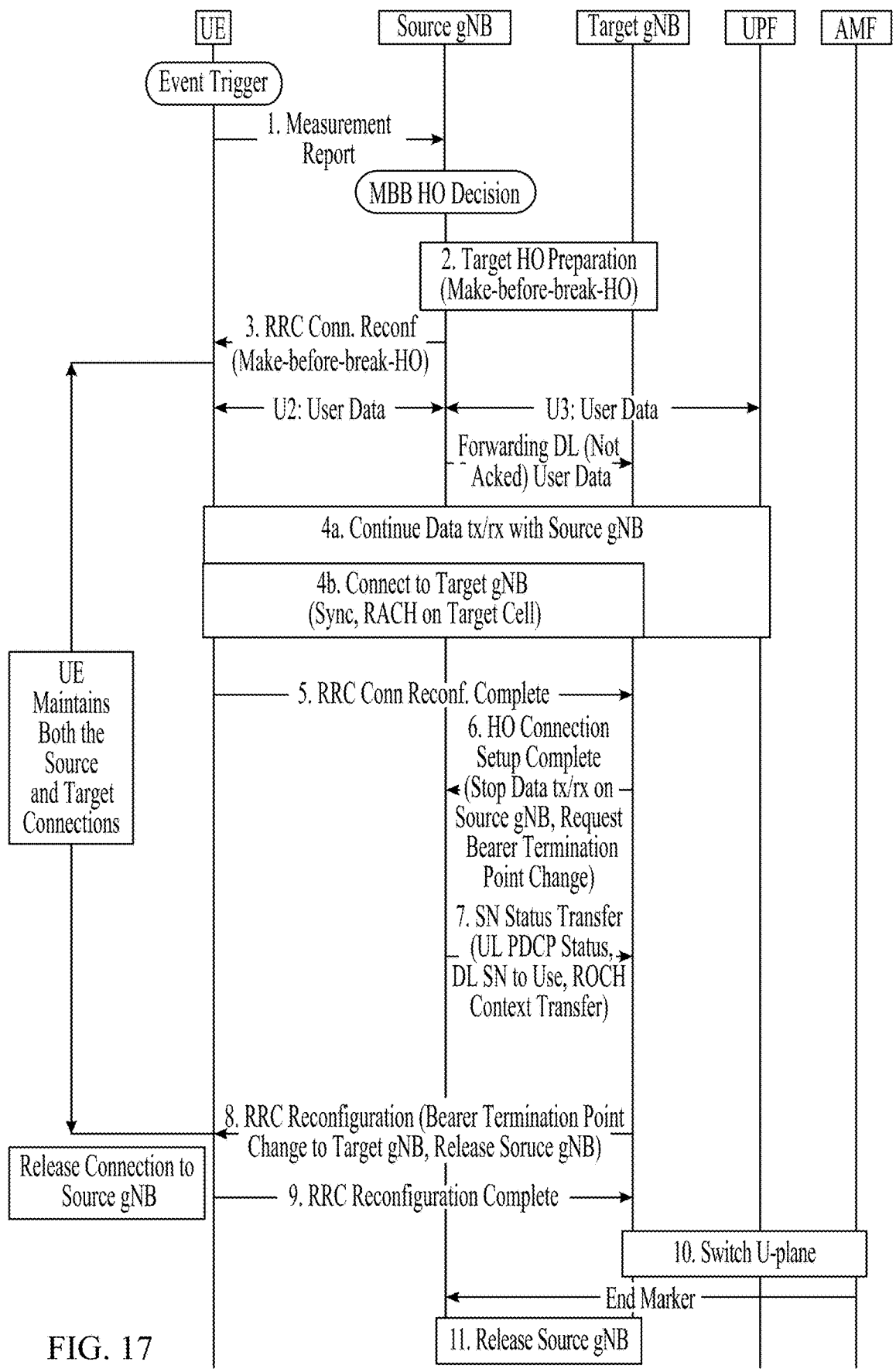
FIG. 17 is another example call flow showing header compression during handover with bearer termination point change for split bearer in a wireless communication network, in accordance with aspects of the present disclosure.

FIG. 17 illustrates an example call flow diagram for handling in a case of bearer termination point change for split bearer. In this example, the source gNB can indicate to the target gNB about the ROHC context and IR mode of operation. The target gNB may sends a PDCP control PDU, or in PDCP header bits, to the UE after step 7. The UE switches to IR mode/disabled ROHC mode after receiving the PDCP control PDU. The target cell signals the UE to switch to ROHC compressed mode of operation after source connection is released in a MBB HO as shown in FIG. 17 (PDCP control PDU sent to UE after source is released; or the target gNB determines based on step 9).

When split bearers are supported and the PDCP anchor has to change to target gNB, following conventional (e.g., Rel. 15) procedures may result in PDCP Reestablishment and an ROHC context reset and some interruption.

One solution to avoid this reestablishment is to extend the same PDCP entity for target link handling (e.g., the common PDCP entity). In such cases, on indicating the switch of the PDCP anchor, i.e. bearer termination point change from source gNB to target gNB via the RRC Reconfiguration message sent to the UE, UE uses the same ROHC decompression context but different security context for deciphering the packets received on target link.

The source gNB may forward the ROHC context to the target gNB and target gNB uses the transferred ROHC context to send the DL data forwarded on Xn. In some cases, this bearer termination point change may be designed to avoid PDCP Re-establishment/ROHC reset applies even for a DCRS based HO bearer termination point change. This approach may also be extended to apply for a regular DC bearer termination point change.

Figure 18:
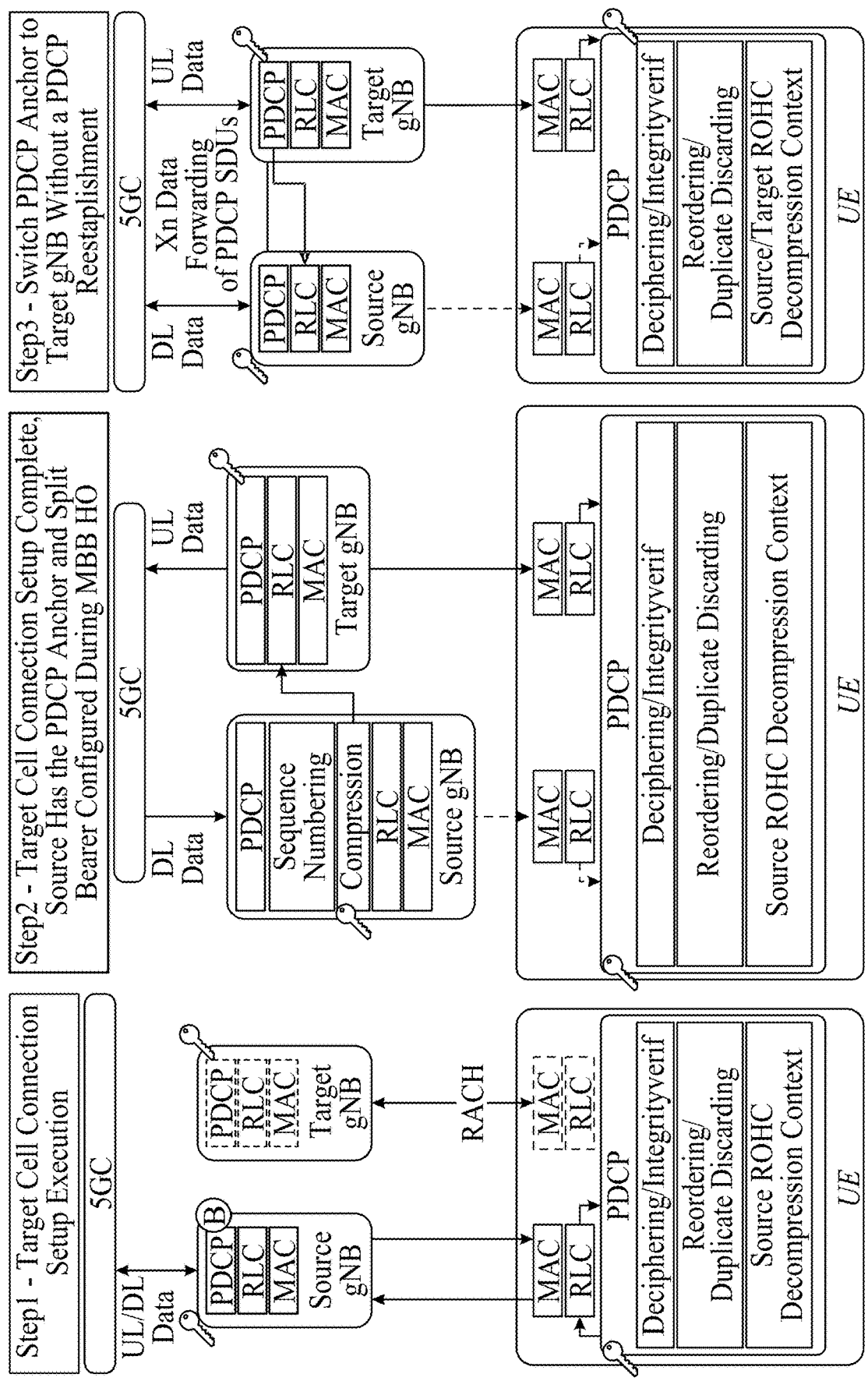
FIG. 18 is an example showing user plane architecture showing header compression during handover with bearer termination point change for split bearer in a wireless communication network, in accordance with aspects of the present disclosure.

FIG. 18 illustrates an example of DL ROHC handling for a split bearer scenario. As illustrated, in a first step (Step 1), the target cell connection setup is executed. In a second step (Step 2), the target cell connection setup is complete, the source cell has the PDCP anchor and split bearer configured during MBB HO. In a third step (Step 3), the PDCP Anchor is switched to the target gNB without a PDCP reestablishment. As illustrated, separate keys may be used for the connections to the source and target cells during the concurrent connection stage.

When split bearers are supported and the PDCP anchor has to change to target gNB, following conventional (e.g., Rel. 15) procedures may result in PDCP Reestablishment and ROHC context reset and some interruption.

One solution to avoid this reestablishment is to extend the same PDCP entity for target link handling (e.g., the common PDCP entity). On indicating the switch of the PDCP anchor (e.g., a bearer termination point change) from source gNB to target gNB via the RRC Reconfiguration message sent to the UE, the UE may use the same ROHC decompression context but different security context for deciphering the packets received on the target link. In this case, the source gNB may forward the ROHC context to the target gNB and target gNB uses the transferred ROHC context to send the DL data forwarded on Xn.

Figure 19:
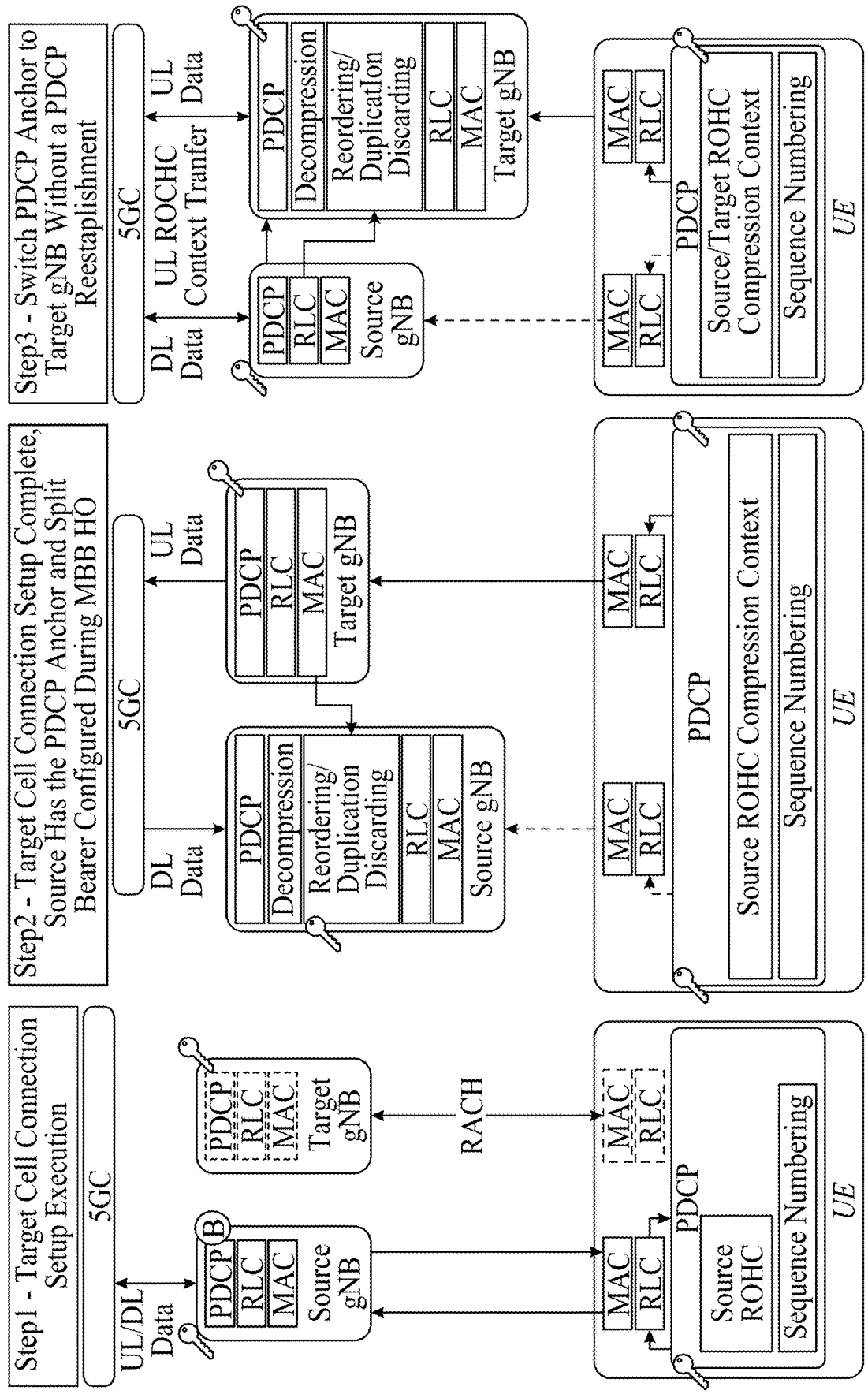
FIG. 19 is an example user plane architecture showing header compression during handover with bearer termination point change for split bearer in a wireless communication network, in accordance with aspects of the present disclosure.

FIG. 19 illustrates an example of UL ROHC handling for a split bearer scenario. As illustrated, in a first step (Step 1), the target cell connection setup is executed. In a second step (Step 2), the target cell connection setup is complete, the source cell has the PDCP anchor and split bearer configured during MBB HO. In a third step (Step 3), the PDCP Anchor is switched to the target gNB without a PDCP reestablishment. As illustrated, separate keys may be used for the data connections to the source and target cells during the concurrent connection stage.

In this example, the UE uses the same ROHC compression context even after bearer termination point (e.g., the PDCP Anchor) changes to the target gNB. In this example, the source gNB sends the UL ROHC context to the target gNB and the target gNB uses the transferred ROHC context to decompress the PDCP PDUs received over split bearer.

Figure 20:
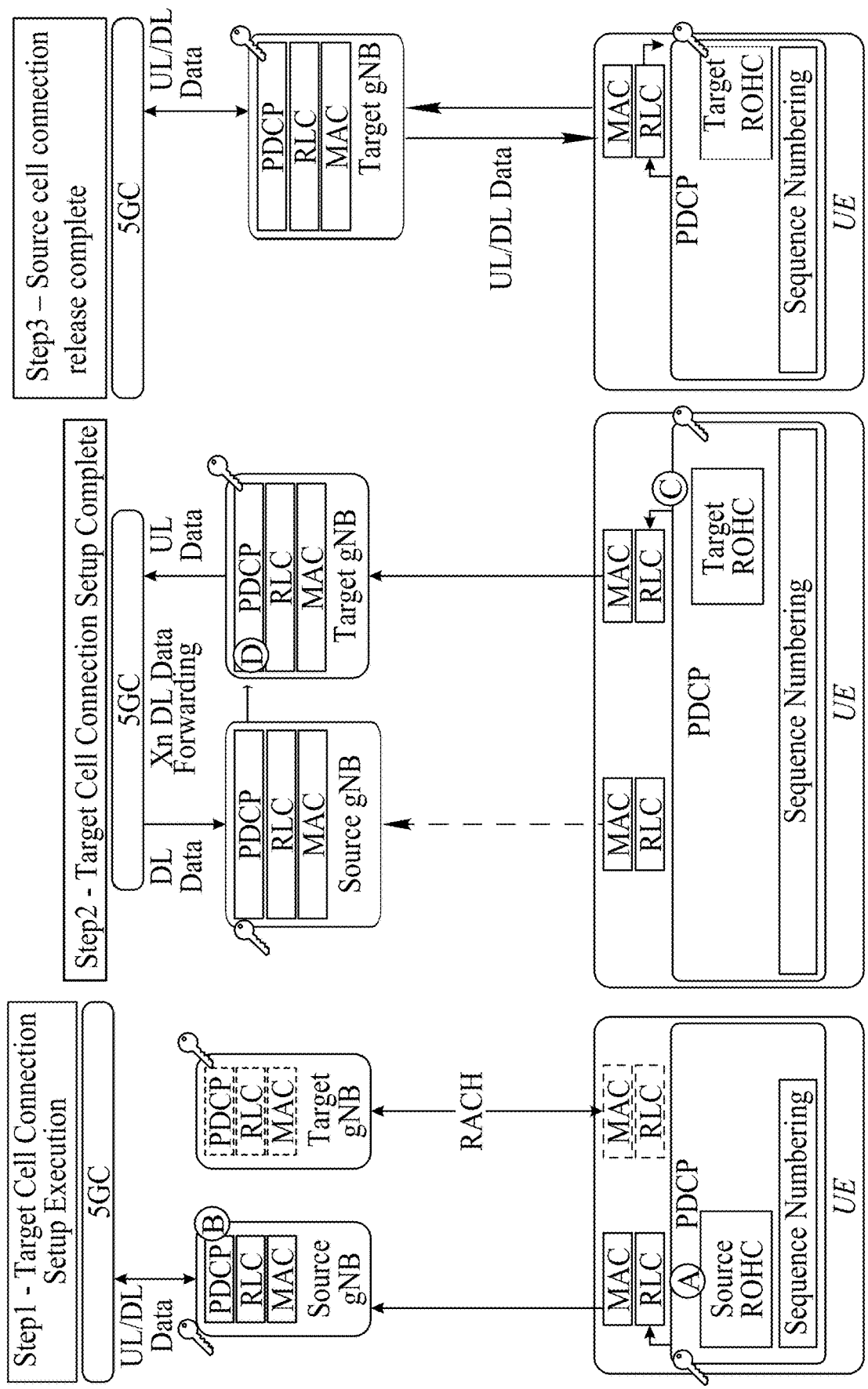
FIG. 20 is an example user plane architecture showing header compression without uplink data duplication and with single context during handover in a wireless communication network, in accordance with aspects of the present disclosure.

Header Compression with Single Context and without UL Data Duplication During Handover FIG. 20 illustrates a user plane radio architecture for an example of uplink ROHC handling during handover with a single context and without data duplication.

As shown in FIG. 20, at step 2, after the target cell connection setup is complete and before the source cell connection is released, the UE uplink data communications (transmit and receive) can be switched to the target cell connection. That is, the UE switches UL data transmission to the target cell after successful RACH on target cell. The source cell performs downlink data forwarding procedures with the target cell. Thus, the UL data is transmitted on either the source connection or target connection only but not both during the handover (e.g., the DAPS or MBB handover, which may be inter-CU).

During the target cell connection setup, while the UE is performing RACH on the target cell, any UL data available in the PDCP buffer is transmitted by the UE using the source ROHC compression context (at step A). This UL data is received only by the source gNB and the source gNB can use its corresponding ROHC decompression context (at Step B) for the data. The source gNB forwards the decompressed data to the 5GC over NG-U.

After the target cell connection is setup (e.g., successful transmission of RRC Reconfiguration complete message) cell, UL data available in the PDCP buffer is transmitted only on the target connection (at Step C). The common PDCP entity on the UE can continue the ROHC context even after switching the UL data transmission from the source connection to the target connection—without PDCP re-establishment (e.g., maintaining the PDCP SN continuity), if drb-ContinueROHC is set to TRUE and indicate that the PDCP entity continue ROHC context. Thus, only the target gNB receives UL data from the UE (at Step D)—the source gNB does not receive any UL data after connection with the target gNB is setup. The source gNB transfers the ROHC context to the target gNB over Xn via SN Status Data Transfer to support ROHC continuity over the target connection during the handover. If drb-ContinueROHC is set to FALSE, then the common PDCP entity of the UE switches the ROHC context to the target connection ROHC handling after switching the UL data transmission from the source connection to the target connection. The source gNB may not transfer the ROHC context to the target gNB—as ROHC continuity is not needed.

Figure 21:
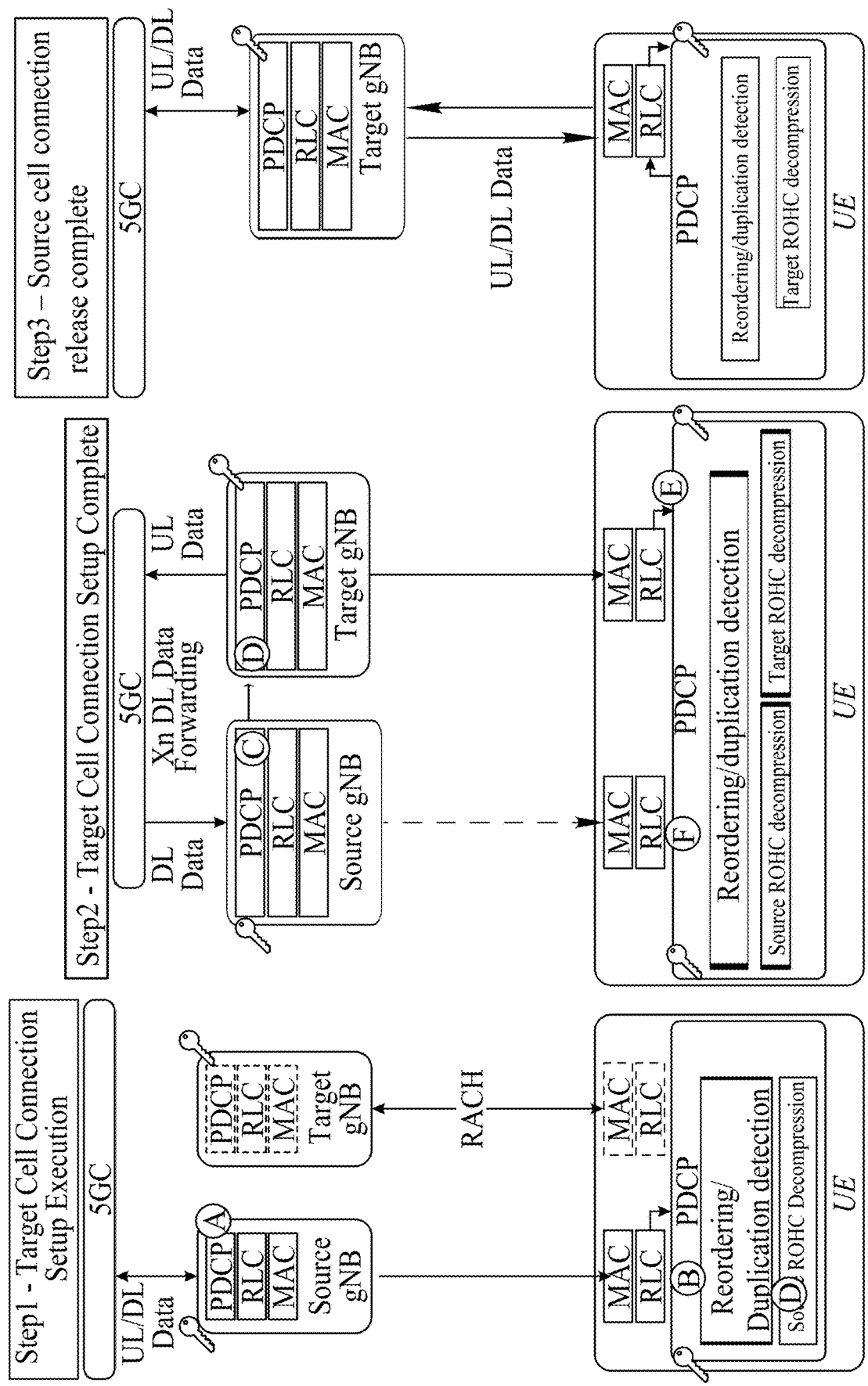
FIG. 21 is an example user plane architecture showing header compression with downlink data duplication and dual contexts during handover in a wireless communication network, in accordance with aspects of the present disclosure.

Header Compression with Downlink Data Duplication and Dual Contexts During Handover FIG. 21 illustrates a user plane radio architecture for an example of uplink ROHC handling during handover with dual contexts and with data duplication.

As shown in FIG. 21, after the target cell connection setup is complete (at Step 2) and before the source cell connection is released, the UE downlink data communication (e.g., transmission and reception) can be switched to the target cell connection. That is, the source cell performs DL data forwarding procedures with the target and stops DL data transfer to the target cell. In some cases, there could be a period during which UE may receive DL data on both source and target connections simultaneously during handover, with data duplication.

During the target cell connection setup (e.g., while the UE is performing RACH on the target cell), DL data can be transmitted by the source gNB using the source ROHC compression context (at Step A). This DL data is received by the UE (at Step B) and decompressed using the source ROHC decompression context.

After the target cell connection set up is completed (e.g., successful transmission of RRC Reconfiguration complete), the source gNB and target gNB coordinate to initiate SN status data transfer. The source gNB forwards PDCP SDUs (uncompressed) to the target gNB (at Step C), and indicates the PDCP SN to use for the DL packets. In some cases, the source gNB may also send the duplicate SDUs compressed using the source gNB ROHC context to the UE. The target gNB also transmits the PDCP SDUs received from the source gNB to the UE, after compressing the packets with the target gNB ROHC context. Thus, the UE may receive DL packets compressed with either source gNB or target gNB context during the handover (at Step E and Step F). In order to support ROHC for these packets, the UE maintains dual ROHC context at the common PDCP entity, until source connection is released as shown in FIG. 21. The UE can determine the security key to use for deciphering/ integrity verification, and, subsequently the ROHC context to use for decompression of the PDU based on the logical channel on which the PDU is received.

Thus, according to certain aspects, both source gNB and target gNB link ROHC context may be kept in the UE common PDCP entity during handover (e.g., during Inter-CU MBB HO or DAPS HO), until source connection is released. According to certain aspects, the common PDCP entity in the UE applies different ROHC context for decompression (e.g., the source link or target link ROHC context respectively) of data received on the different logical channels associated with the source link and target link during handover (e.g., during an Inter-CU MBB HO or DAPS HO).

Figure 22:
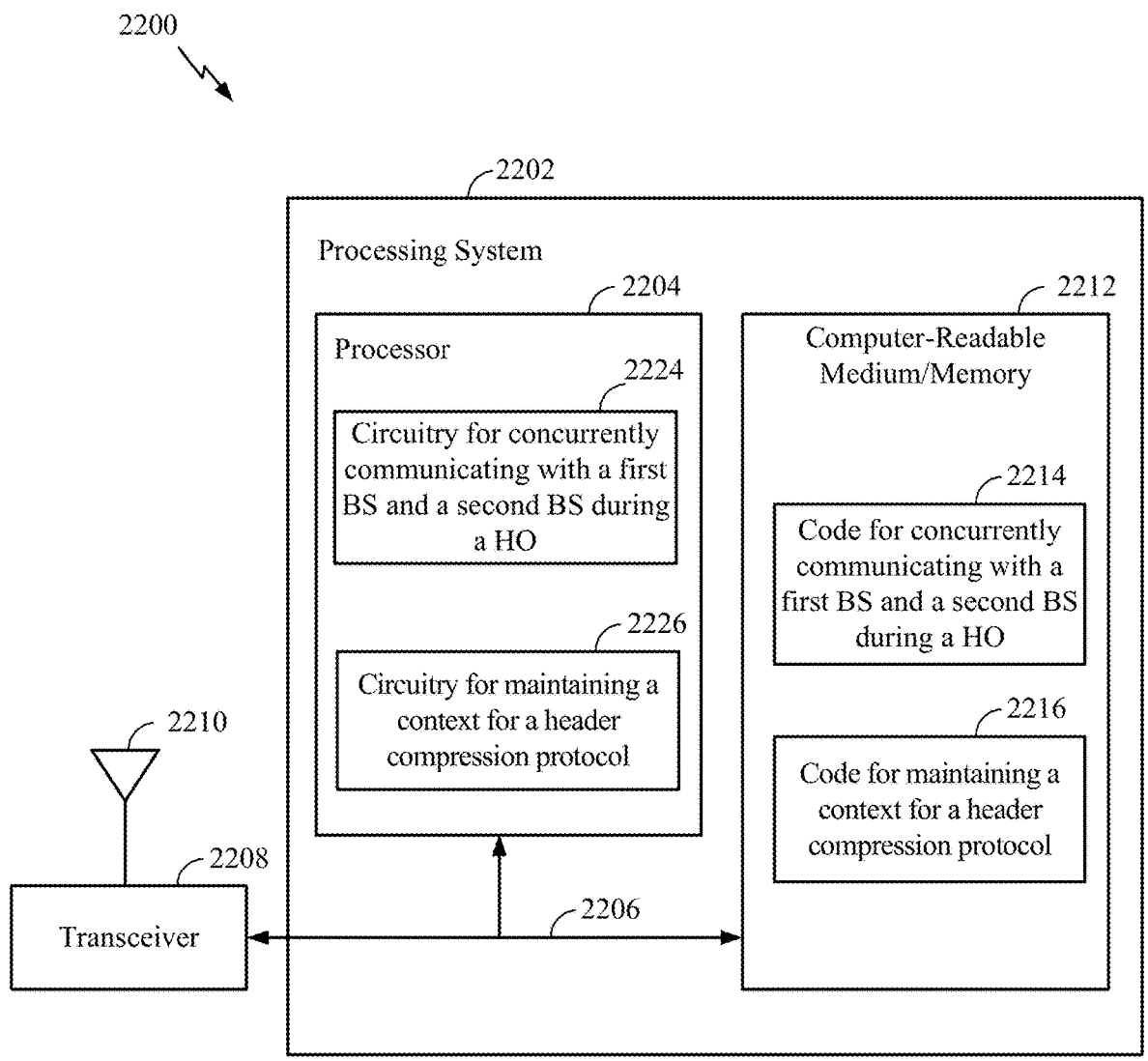
FIG. 22 illustrates a communications device that may include various components configured to perform operations for the techniques disclosed herein in accordance with aspects of the present disclosure.

FIG. 22 illustrates a communications device 2200 that may include various components (e.g., corresponding to means-plus-function components) configured to perform operations for the techniques disclosed herein, such as the operations illustrated in FIG. 8. The communications device 2200 includes a processing system 2202 coupled to a transceiver 2208 (e.g., a transmitter and/or a receiver). The transceiver 2208 is configured to transmit and receive signals for the communications device 2200 via an antenna 2210, such as the various signals as described herein. The processing system 2202 may be configured to perform processing functions for the communications device 2200, including processing signals received and/or to be transmitted by the communications device 2200.

The processing system 2202 includes a processor 2204 coupled to a computer-readable medium/memory 2212 via a bus 2206. In certain aspects, the computer-readable medium/ memory 2212 is configured to store instructions (e.g., computer-executable code) that when executed by the processor 2204, cause the processor 2204 to perform the operations illustrated in FIG. 8, or other operations for performing the various techniques discussed herein for header compression handling during handover. In certain aspects, computer-readable medium/memory 2212 stores code 2214 for concurrently communicating with a first BS and a second BS during a handover; and code 2216 for maintaining a header compression context, in accordance with aspects of the disclosure. In certain aspects, the processor 2204 has circuitry configured to implement the code stored in the computer-readable medium/memory 2212. The processor 2204 includes circuitry 2218 for concurrently communicating with a first BS and a second BS during a handover; and circuitry 2220 for maintaining a header compression context, in accordance with aspects of the disclosure.

Figure 23:
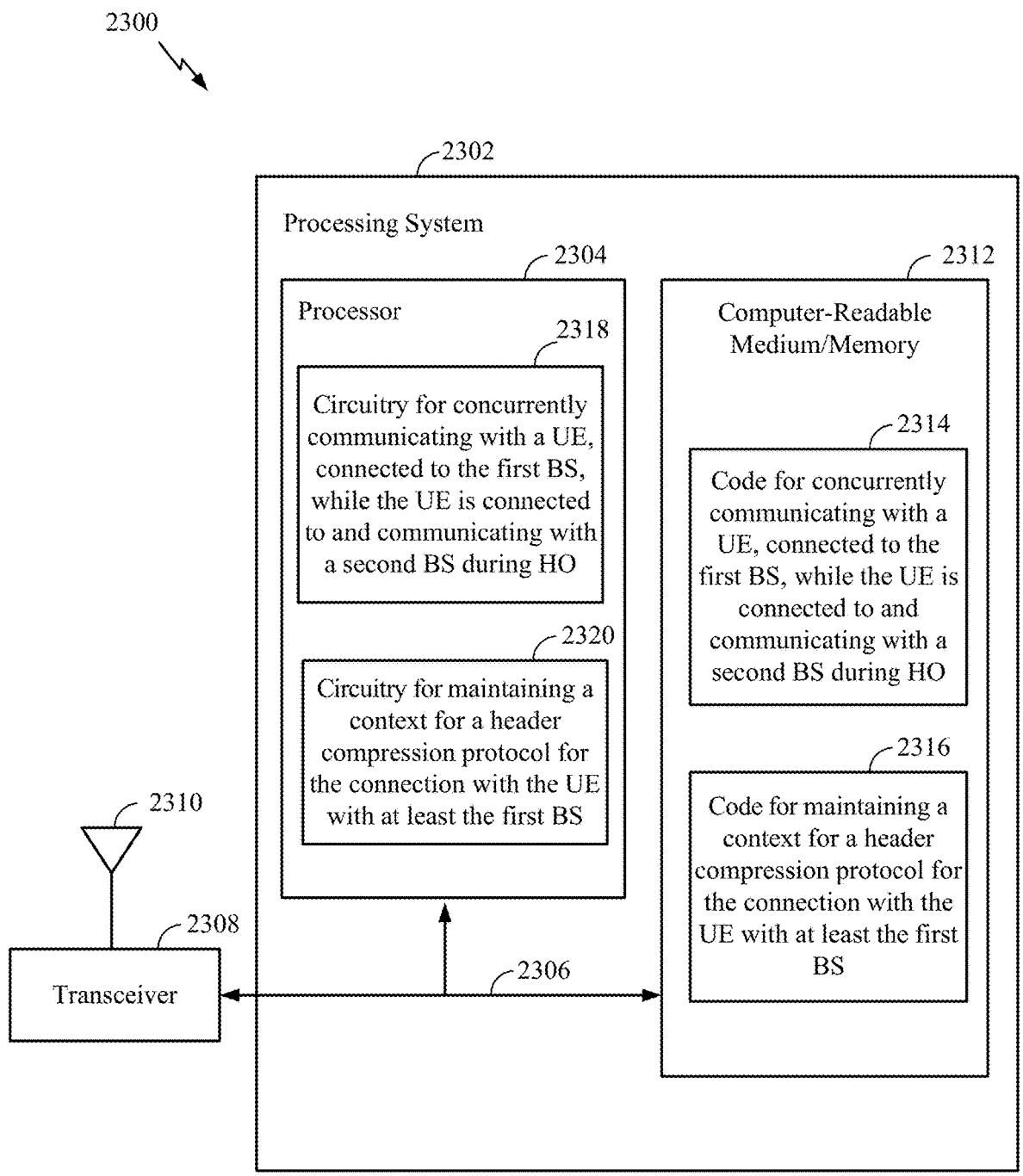
FIG. 23 illustrates a communications device that may include various components configured to perform operations for the techniques disclosed herein in accordance with aspects of the present disclosure.

FIG. 23 illustrates a communications device 2300 that may include various components (e.g., corresponding to means-plus-function components) configured to perform operations for the techniques disclosed herein, such as the operations illustrated in FIG. 9. The communications device 2300 includes a processing system 2302 coupled to a transceiver 2308 (e.g., a transmitter and/or a receiver). The transceiver 2308 is configured to transmit and receive signals for the communications device 2300 via an antenna 2310, such as the various signals as described herein. The processing system 2302 may be configured to perform processing functions for the communications device 2300, including processing signals received and/or to be transmitted by the communications device 2300.

The processing system 2302 includes a processor 2304 coupled to a computer-readable medium/memory 2312 via a bus 2306. In certain aspects, the computer-readable medium/memory 2312 is configured to store instructions (e.g., computer-executable code) that when executed by the processor 2304, cause the processor 2304 to perform the operations illustrated in FIG. 9, or other operations for performing the various techniques discussed herein for header compression protocol handling during a handover. In certain aspects, computer-readable medium/memory 2312 stores code 2314 for concurrently communicating with a user equipment (UE), connected to the first base station (BS), while the UE is connected to and communicating with a second BS during a handover procedure; code 2316 for maintaining a context for a header compression protocol for the connection with the UE with at least the first BS, in accordance with aspects of the disclosure. In certain aspects, the processor 2304 has circuitry configured to implement the code stored in the computer-readable medium/memory 2312. The processor 2304 includes circuitry 2318 for concurrently communicating with a UE, connected to the first BS, while the UE is connected to and communicating with a second BS during a handover procedure; circuitry 2320 for maintaining a context for a header compression protocol for the connection with the UE with at least the first BS, in accordance with aspects of the disclosure.

Example Aspects

In a first aspect, a method of wireless communication performed by a user equipment (UE) includes concurrently communicating with a first base station (BS) on a connection with the first BS and with a second BS on a connection with the second BS during a handover procedure. The UE maintains a context for a header compression protocol for the connection with the first BS and the connection with the second BS. Concurrently communicating includes using the header compression protocol context for sending one or more packets, receiving one or more packets, or both.

In a second aspect, in combination with the first aspect, the header compression protocol comprises a robust header compression (RoHC) protocol.

In a third aspect, in combination with one or more of the first and second aspects, the handover procedure is a make-before-break (MBB) handover procedure or a dual active protocol stack (DAPS) handover procedure.

In a fourth aspect, in combination with one or more of the first through third aspects, the concurrently communicating with the first BS and the second BS includes performing a common packet data convergence protocol (PDCP) function for the connection with the first BS and the connection with the second BS before the connection with the first BS is released as part of the MBB or DAPS handover procedure.

In a fifth aspect, in combination with one or more of the first through fourth aspects, the concurrently communicating with the first BS and the second BS includes communicating on a split radio bearer with at least a first link to the first BS and a second link to the second BS.

In a sixth aspect, in combination with one or more of the first through fifth aspects, maintaining the context for the header compression protocol includes maintaining a single active compressor context and dual active decompressor context for the header compression protocol.

In a seventh aspect, in combination with one or more of the first through sixth aspects, the concurrently communicating with the first BS and the second BS further includes sending uplink data on a single connection with either the second BS or the first BS and compressing the data using the single active context, corresponding to the connection over which data is sent, for the header compression protocol and/or receiving downlink data on a connection with either the second BS or the first BS or receive from both simultaneously and decompressing the downlink data using the decompressor context, corresponding to the connection on which data is received, for the header compression protocol.

In an eighth aspect, in combination with one or more of the first through seventh aspects, the UE sends a packet data convergence protocol (PDCP) control protocol data unit (PDU) to the first BS, after establishing the connection with the second BS, to indicate the uplink data switch to the second BS and maintenance of the single active context corresponding to the second BS.

In a ninth aspect, in combination with one or more of the first through eighth aspects, maintaining the context for the header compression protocol includes switching to an initialization and refresh (IR) state of operation.

In a tenth aspect, in combination with one or more of the first through ninth aspects, the UE sends a packet data convergence protocol (PDCP) protocol data unit (PDU) to signal the first BS and the second BS independently the switch to the IR state of operation.

In an eleventh aspect, in combination with one or more of the first through tenth aspects, the UE requests the second BS to switch to using the header compression protocol with another compressed state of operation after the connection with the first BS is released.

In a twelfth aspect, in combination with one or more of the first through eleventh aspects, maintaining the context for the header compression protocol includes at least temporarily disabling use of the header compression protocol.

In a thirteenth aspect, in combination with one or more of the first through twelfth aspects, the concurrently communicating includes sending uplink data on the connections with both the second BS and the first BS and/or receiving downlink data on the connections with both the second BS and the first BS.

In a fourteenth aspect, in combination with one or more of the first through thirteenth aspects, maintaining the context for the header compression protocol includes maintaining dual compressor contexts for the header compression protocol at the UE independently for the connection with the second BS and the connection with the first BS.

In a fifteenth aspect, in combination with one or more of the first through fourteenth aspects, the UE sends a packet data convergence protocol (PDCP) protocol data unit (PDU) to the second BS to indicate maintenance of the dual contexts.

In a sixteenth aspect, in combination with one or more of the first through fifteenth aspects, the PDCP PDU corresponds to a PDCP control PDU or setting specific bits in the PDCP data PDU header and the PDCP PDU is sent prior to activating uplink data duplication on the connection with both the second BS and the first BS.

In a seventeenth aspect, in combination with one or more of the first through sixteenth aspects, the UE activates the uplink data duplication after sending the PDCP PDU or after receiving a positive acknowledgment of the PDCP PDU.

In an eighteenth aspect, a method of wireless communication performed by first base station (BS) includes concurrently communicating with a user equipment (UE), connected to the first base station (BS), while the UE is connected to and communicating with a second BS during a handover procedure. The first BS maintains a context for a header compression protocol for the connection with the UE with at least the first BS. The concurrently communicating includes using the header compression protocol context for sending one or more packets, receiving one or more packets, or both.

In a nineteenth aspect, in combination with the eighteenth aspect, the header compression protocol comprises at least a robust header compression (RoHC) protocol.

In a twentieth aspect, in combination with one or more of the eighteenth and nineteenth aspects, the handover procedure is a make-before-break (MBB) handover procedure or a dual active protocol stack (DAPS) handover procedure.

In a twenty-first aspect, in combination with one or more of the eighteenth through twentieth aspects, the concurrently communicating includes performing a common packet data convergence protocol (PDCP) function for the connection with the UE with the first BS and the connection with the UE with the second BS before the connection with the first BS is released as part of the MBB or DAPS handover procedure.

In a twenty-second aspect, in combination with one or more of the eighteenth through twenty-first aspects, the concurrently communicating includes communicating on a split radio bearer with at least a first link to the first BS and a second link to the second BS.

In a twenty-third aspect, in combination with one or more of the eighteenth through twenty-second aspects, maintaining the context for the header compression protocol includes maintaining a single active context for the header compression protocol.

In a twenty-fourth aspect, in combination with one or more of the eighteenth through twenty-third aspects, the concurrently communicating includes sending downlink data on a single connection with the UE and compressing the data using the single active context for the header compression protocol and/or receiving uplink data on a single connection with the UE and decompressing the downlink data using the single active context for the header compression protocol.

In a twenty-fifth aspect, in combination with one or more of the eighteenth through twenty-fourth aspects, the first BS reorders and/or discards duplicate data for forwarded uplink packet data convergence protocol (PDCP) protocol data unit (PDU) from the second BS before performing decompression using the single context for the header compression protocol.

In a twenty-sixth aspect, in combination with one or more of the eighteenth through twenty-fifth aspects, maintaining the context for the header compression protocol includes at least temporarily disabling use of the header compression protocol.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable.

The UEs 120 (e.g., 120x, 120y, etc.) may be dispersed throughout the wireless communication network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method of wireless communication performed by a user equipment (UE), comprising:
concurrently communicating with a first base station (BS) on a connection with the first BS and with a second BS on a connection with the second BS during a handover procedure using one or more contexts for header compression protocol for sending one or more packets, receiving one or more packets, or both; and
maintaining, during the handover procedure, a single active compressor context and dual active decompressor contexts for the header compression protocol for both the connection with the first BS and the connection with the second BS.

2. The method of claim 1, wherein the header compression protocol comprises a robust header compression (RoHC) protocol.

3. The method of claim 1, wherein the handover procedure is a make-before-break (MBB) handover procedure or a dual active protocol stack (DAPS) handover procedure.

4. The method of claim 3, wherein the concurrently communicating with the first BS and the second BS further comprises:
performing a common packet data convergence protocol (PDCP) function for the connection with the first BS and the connection with the second BS before the connection with the first BS is released as part of the MBB or DAPS handover procedure.

5. The method of claim 1, wherein the concurrently communicating with the first BS and the second BS further comprises:
communicating on a split radio bearer with at least a first link to the first BS and a second link to the second BS.

6. The method of claim 1, wherein the concurrently communicating with the first BS and the second BS further comprises:
sending uplink data on the connection with either the second BS or the first BS and compressing the uplink data using the single active compressor context corresponding to the connection over which the uplink data is sent;
receiving downlink data on the connection with either the second BS or the first BS or receiving downlink data from both the second BS and the first BS simultaneously and decompressing the downlink data using the decompressor context, of the dual active decompressor contexts, corresponding to the connection on which the downlink data is received; or
both.

7. The method of claim 1, further comprising:
sending a packet data convergence protocol (PDCP) control protocol data unit (PDU) to the first BS, after establishing the connection with the second BS, to indicate uplink data switch to the second BS and maintenance of the single active compressor context corresponding to the second BS.

8. The method of claim 1, further comprising switching to an initialization and refresh (IR) state of operation.

9. The method of claim 8, further comprising:
sending a packet data convergence protocol (PDCP) protocol data unit (PDU) to signal the first BS and the second BS independently the switch to the IR state of operation.

10. The method of claim 8, further comprising:
requesting the second BS to switch to using the header compression protocol with another compressed state of operation after the connection with the first BS is released.

11. The method of claim 1, further comprising at least temporarily disabling use of the header compression protocol.

12. The method of claim 1, wherein the concurrently communicating comprises:
sending uplink data on the connection with both the second BS and the first BS;
receiving downlink data on the connection with both the second BS and the first BS; or
both.

13. The method of claim 1, further comprising:
sending a packet data convergence protocol (PDCP) control protocol data unit (PDU) or a PDCP data PDU prior to activating uplink data duplication on the connection with both the second BS and the first BS.

14. The method of claim 13, further comprising activating the uplink data duplication:
after sending the PDCP control PDU or PDCP data PDU; or
after receiving a positive acknowledgment of the PDCP control PDU or PDCP data PDU.

15. A method of wireless communication performed by a first base station (BS), comprising:
concurrently communicating with a user equipment (UE), connected to the first BS, while the UE is connected to and communicating with a second BS during a handover procedure using one or more contexts for header compression protocol for sending one or more packets, receiving one or more packets, or both; and
maintaining, during the handover procedure, a single active compressor context and a single active decompressor context for the header compression protocol for the connection with the UE with at least the first BS, wherein the single active compressor context is different than a compressor context maintained by the second BS.

16. The method of claim 15, wherein the header compression protocol comprises at least a robust header compression (RoHC) protocol.

17. The method of claim 15, wherein the handover procedure is a make-before-break (MBB) handover procedure or a dual active protocol stack (DAPS) handover procedure.

18. The method of claim 17, wherein the concurrently communicating comprises:
performing a common packet data convergence protocol (PDCP) function for the connection with the UE with the first BS and the connection with the UE with the second BS before the connection with the first BS is released as part of the MBB or DAPS handover procedure.

19. The method of claim 15, wherein the concurrently communicating comprises communicating on a split radio bearer with at least a first link to the UE while the UE communicates with a second link to the second BS.

20. The method of claim 15, wherein the concurrently communicating comprises:
sending downlink data on the connection with the UE and compressing the downlink data using the single active compressor context;
receiving uplink data on the connection with the UE and decompressing the downlink data using the single active decompressor context; or
both.

21. The method of claim 20, further comprising:
at least one of: reordering or discarding duplicate data for forwarded uplink packet data convergence protocol (PDCP) protocol data unit (PDU) from the second BS before performing decompression using the single active decompressor context.

22. The method of claim 15, further comprising at least temporarily disabling use of the header compression protocol.

23. An apparatus for wireless communication, comprising:
at least one processor coupled with a memory, the memory comprising code executable by the at least one processor to cause the apparatus to:
concurrently communicate with a first base station (BS) on a connection with the first BS and with a second BS on a connection with the second BS during a handover procedure using one or more contexts for header compression protocol for sending one or more packets, receiving one or more packets, or both; and
maintain, during the handover procedure, a single active compressor context and dual active header decompressor contexts for the header compression protocol for both the connection with the first BS and the connection with the second BS.

24. The apparatus of claim 23, wherein the header compression protocol comprises a robust header compression (RoHC) protocol.

25. The apparatus of claim 23, wherein the handover procedure is a make-before-break (MBB) handover procedure or a dual active protocol stack (DAPS) handover procedure.

26. The apparatus of claim 25, wherein to concurrently communicate with the first BS and the second BS further comprises to:
perform a common packet data convergence protocol (PDCP) function for the connection with the first BS and the connection with the second BS before the connection with the first BS is released as part of the MBB or the DAPS handover procedure.

27. The apparatus of claim 23, wherein to concurrently communicate with the first BS and the second BS further comprises to:
communicate on a split radio bearer with at least a first link to the first BS and a second link to the second BS.

28. The apparatus of claim 23, wherein to concurrently communicate with the first BS and the second BS further comprises to:
send uplink data on the connection with either the second BS or the first BS and to compress the uplink data using the single active compressor context corresponding to the connection over which the uplink data is sent;
receive downlink data on the connection with either the second BS or the first BS or to receive downlink data from both the second BS and the first BS simultaneously and to decompress the downlink data using the decompressor context, of the dual active decompressor contexts, corresponding to the connection on which the downlink data is received; or
both.

29. The apparatus of claim 23, wherein the memory comprises code executable by the at least one processor to cause the apparatus to:
    send a packet data convergence protocol (PDCP) control protocol data unit (PDU) to the first BS, after establishing the connection with the second BS, to indicate uplink data switch to the second BS and maintenance of the single active compressor context corresponding to the second BS.

30. An apparatus for wireless communication, comprising:
    at least one processor coupled with a memory, the memory comprising code executable by the at least one processor to cause the apparatus to:
        concurrently communicate with a user equipment (UE), connected to the apparatus, while the UE is connected to and communicating with another apparatus during a handover procedure using one or more contexts for header compression protocol for sending one or more packets, receiving one or more packets, or both; and
        maintaining, during the handover procedure, a single active compressor context and a single active decompressor context for the header compression protocol for the connection with the UE with at least the apparatus, wherein the single active compressor context is different than an active compressor context maintained by the other apparatus.

* * * * *